United States Patent [19]

Yamashita et al.

[11] Patent Number: 4,916,035
[45] Date of Patent: Apr. 10, 1990

[54] PHOTOELECTROCHEMICAL CELLS HAVING FUNCTIONS AS A SOLAR CELL AND A SECONDARY CELL

[75] Inventors: Akio Yamashita, Kanagawa; Satoshi Sekido; Takeshi Takeda, both of Kawasaki; Sohji Tsuchiya, Kanagawa, all of Japan

[73] Assignee: Matsushita Electric Industrial Co., Ltd., Osaka, Japan

[21] Appl. No.: 232,637

[22] Filed: Aug. 8, 1988

[30] Foreign Application Priority Data

| Aug. 6, 1987 | [JP] | Japan | 62-196720 |
| Nov. 10, 1987 | [JP] | Japan | 62-283546 |
| Nov. 10, 1987 | [JP] | Japan | 62-283547 |
| Nov. 10, 1987 | [JP] | Japan | 62-283551 |
| Jun. 16, 1988 | [JP] | Japan | 63-148551 |
| Jun. 16, 1988 | [JP] | Japan | 63-148552 |

[51] Int. Cl.$^4$ ............... H01M 6/30; H01L 31/04
[52] U.S. Cl. .................................................. 429/111
[58] Field of Search ...................................... 429/111

[56] References Cited

U.S. PATENT DOCUMENTS

| 4,119,768 | 10/1978 | Bayard | 429/111 |
| 4,235,955 | 11/1980 | Sammells et al. | 429/111 |

OTHER PUBLICATIONS

"Photo-Electrochemical Studies on Intercalation and Semiconducting Intercalation Compounds", by Helmut Tributsch; *Solid State Ionics* 9 & 10 (1983)41–58; North-Holland Publishing Company.

"Photoelectrochemical Energy Conversion Involving Transition Metal d-States and Intercalation of Layer Compounds", by Helmut Tributsch; *Structure and Bonding* 49; Springer-Verlag, Berlin-Heidelberg (1982).

*Primary Examiner*—Aaron Weisstuch
*Attorney, Agent, or Firm*—Lowe, Price, LeBlanc, Becker & Shur

[57] ABSTRACT

Photoelectrochemical cells comprising a positive electrode comprised of an n-type conductive semiconductor and a compound capable of reversibly intercalating or deintercalating metal atoms or ions, an ion conductive solid electrolyte layer, a negative electrode, and current collectors for the positive and negative electrodes. The intercalating or deintercalating compound is a Chevrel compound or vornite. The photoelectrochemical cell serves as both solar and secondary cells. Various cell constructions are also described including a multi-layered structure and a two-cell construction.

58 Claims, 14 Drawing Sheets

PHOTOELECTROCHEMICAL CELLS HAVING FUNCTIONS AS A SOLAR CELL AND A SECONDARY CELL

BACKGROUND OF THE INVENTION

1. Field of the Invention

This invention relates to solid-state photoelectrochemical cells having functions as both solar and secondary cells which can be widely utilized in various fields, including electronic watches or time pieces, permanent electric power sources for electronic computers, memory backup, photoelectric power generation and storage, and the like. The photoelectrical cell may often be referred to simply as "photocell".

2. Description of the Prior Art

A Si solar cell or battery is known as a typical physical photocell. A typical example of a chemical photocell known in the art is an optical water decomposition cell using $TiO_2$. However, power source devices that function both as a solar cell and a secondary cell have not yet been practically realized. Existing cells are those in which a solar cell and a secondary cell are provided separately. In these cell systems, the solar and secondary cells are connected in parallel with a load. The power produced in the solar cell is stored in the secondary cell. When no light is expected as in the night or when an instantaneous large current is required, electric power is supplied to a load from the secondary cell.

In recent years, many attempts have been made using semiconductor electrodes in which an electrochemical reaction is caused to proceed by incidence of light on the electrodes to obtain useful substances and to store electric power. For instance, a cell is made using an n-$TiO_2$ photo-electrode and a platinum electrode in which water is photochemically decomposed to obtain $O_2$ gas at the photo-electrode and $H_2$ gas at the platinum electrode. This cell is an example of obtaining useful gases or substances. However, the cell has not been reduced to practice yet as a photoelectrochemical cell although $TiO_2$ has been evidenced as decomposing water by irradiation of light. This is because $TiO_2$ has a large a band gap of about 3 eV with the following difficulties. An electromotive force cannot be generated in the absence of near ultraviolet or ultraviolet light, and the quantum efficiency is still not satisfactory. Also, a cell using water is more unlikely to be utilized than solid-state cells.

In *Solid State Ionics*, September 10, 1983, pp. 41-58, by North Holland Publishing Company, and *Structure & Bonding*, 49(1982), Springer Verlag, there has been shown the possibility of making an optical and secondary cell using an n-type $ZrS_{2-y}$ electrode which is capable of deintercalation of $Cu^+$ ions. However, when the n-type $ZrS_{2-y}$ photo-electrode is used along with an aqueous electrolyte solution, a photo-corrosion reaction with the aqueous electrolyte solution as well as the photo-charging reaction undesirably takes place, with an attendant disadvantage that the life of the cell becomes very short.

SUMMARY OF THE INVENTION

It is accordingly an object of the invention to provide a photoelectrochemical cell which serves as both a solar cell and a secondary cell and is relatively simple in construction.

It is another object of the invention to provide a solid-state photoelectrochemical cell which is small in size and inexpensive, and has good reversibility.

It is a further object of the invention to provide a solid-state photoelectrochemical cell which is capable of rapid photo-charging with a long life.

It is a still further object of the invention to provide a solid-state photoelectrochemical cell which is capable of charge and discharge of a large electric current.

In a broad aspect, a photoelectrochemical cell according to the invention comprises a positive electrode made of an n-type conductivity semiconductor which is able to generate electron-hole pairs when excited with light and a metal-containing compound having a three-dimensional structure which allows the metal atoms to be deintercalated with the holes in the form of metal ions, a positive current collector provided in contact with the positive electrode, a metal ion conductive solid electrolyte layer which is provided in contact with one side of the positive electrode, a negative electrode provided in contact with the solid electrolyte layer at one side thereof without direct contact with the positive electrode, and a current collector for the negative electrode provided on the other side of the negative electrode, whereby when light is irradiated on the positive electrode, the cell is electrochemically charged and discharged when the positive and negative electrodes are electrically connected.

The positive electrode may consist of one layer which is made of a mixture of the n-type conductive semiconductor and the metal-containing compound, or may consist of two layers which are, respectively, a photo-electrode made of the conductive semiconductor and a capacitive electrode made of the deintercalative compound.

The positive electrode and the negative electrode may be formed on the opposite sides of the solid electrolyte layer, or may be formed in side-by-side relationship on one side of the solid electrolyte so that they are kept apart from each other without direct contact. In the latter case, the negative electrode is preferably arranged to have a two-layer structure similar to the positive electrode. More particularly, the negative electrode includes a negative photo-electrode made of a p-type semiconductor capable of generating electron-hole pairs by application of light and a negative capacitive electrode capable of converting the metal ions into the metal atoms by reduction with the electrons formed in the p-type semiconductor. The electrons formed in the positive photo-electrode and the holes generated in the negative photo-electrode flow in opposite directions through an external circuit. This type of photocell is more advantageous in quantum efficiency than a photocell using one photo-electrode. In this case, the respective current collectors are formed on the other side which does not contact with the solid electrolyte layer. In the above embodiment, a transparent substrate may be formed on the conductive semiconductor electrode serving as an optical or photo-electrode by a usual manner.

In accordance with another embodiment of the invention, there is also provided a photocell which comprises a positive photo-electrode cell and a negative photo-electrode cell, which are formed on one surface of an optionally transparent substrate and which are electrically connected with each other through a metal electrode. This photocell is of a side-by-side relation type. The positive cell includes a photo-electrode of an n-type semiconductor, a capacitive electrode, a common solid electrolyte layer and a common metal electrode deposited on one side of the transparent substrate in this order. The negative cell includes a photo-electrode of a p-type semiconductor, a capacitive electrode, the common solid electrolyte layer and the common electrode deposited on the same side of the transparent substrate as the positive cell in this order, but kept apart from the positive cell. This cell construction is effective in increasing charge and discharge current and improving capacitive density.

In the photocells of the invention, a variety of compounds or materials may be used in combination for the the positive and negative electrodes, the solid electrolyte layer, the current collectors and the like. These combinations will be described particularly in the following description with reference to the accompanying drawings.

DETAILED DESCRIPTION AND EMBODIMENTS OF THE INVENTION

Figure 1:
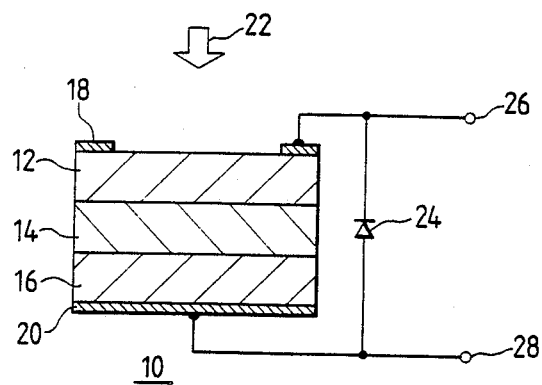
FIG. 1 is a schematic sectional view of a photocell according to one embodiment of the invention.

Referring now to the accompanying drawings, in which like reference numerals indicate like parts throughout the specification, and particularly to FIG. 1, there is generally shown a photoelectrochemical cell 10 according to the invention. The photocell 10 includes a positive electrode 12, a solid electrolyte layer 14 contacting the positive electrode 12 on one side, and a negative electrode 16 formed on the other side of the solid electrolyte layer 14. The positive and negative electrodes 12, 16 have, respectively, current collectors 18 and 20. The current collector 18 for the positive electrode 12 is provided along a marginal or peripheral portion thereof to allow light 22 to pass into the positive electrode 12. Reference numeral 24 indicates a Zener diode serving as a discharge current stopper and overcharge limiter. Reference numerals 26, 28 indicate terminals between which a load may be connected.

In this embodiment, the positive electrode 12 is made of a mixture of a conductive semiconductor for the photo-electrode and a compound having a three-dimensional structure containing layers of metal atoms which allows the metal atoms to be deintercalated by oxidation with holes into metal ions.

Figure 2:
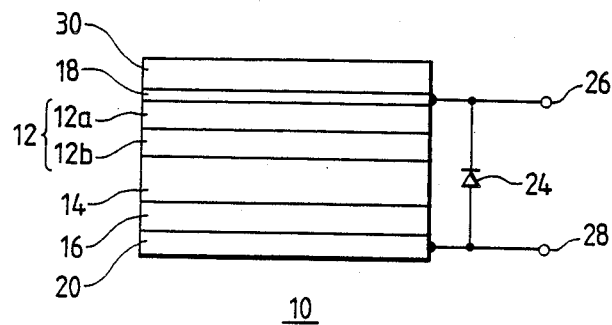
FIG. 2 is a schematic side view of a photocell according to another embodiment of the invention.

FIG. 2 shows another embodiment of the invention. The photocell 10 of this embodiment is similar to the photocell of FIG. 1 except that the cell element is provided on a transparent substrate 30 such as glass and the positive electrode is made of two layers 12a and 12b which are, respectively, a positive photo-electrode and a capacitive electrode. The transparent substrate 30 is not essential but an alternative.

The working principle of the photocell 10 of FIGS. 1 and 2 is now described. A photocell model consisting of a photo-electrode, a solid electrolyte layer and a negative electrode of an n-type semiconductor layer compound formed in this order is first considered. Irradiation of light 22 on the photocell results in charging due to deintercalation of cations such as, for example $Cu^+$ ions, from the photo-electrode by reception of electrons from the negative electrode 16. In this condition, when a load is connected between the terminals 26 and 28, discharge takes place.

Figure 3:
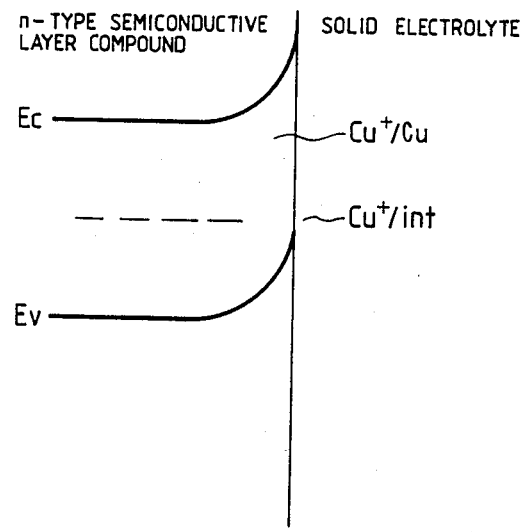
FIG. 3 is a view of an energy band structure of an n-type semiconductor layer compound and a solid electrolyte.

This is more particularly illustrated with reference to FIG. 3, which shows an energy band structure of the n-type semiconductor Cu layer type compound used as the photo-electrode, $H^+$. When the layer compound absorbs light at an energy level higher than the band gap thereof, electrons and positive holes are formed.

Figure 4:
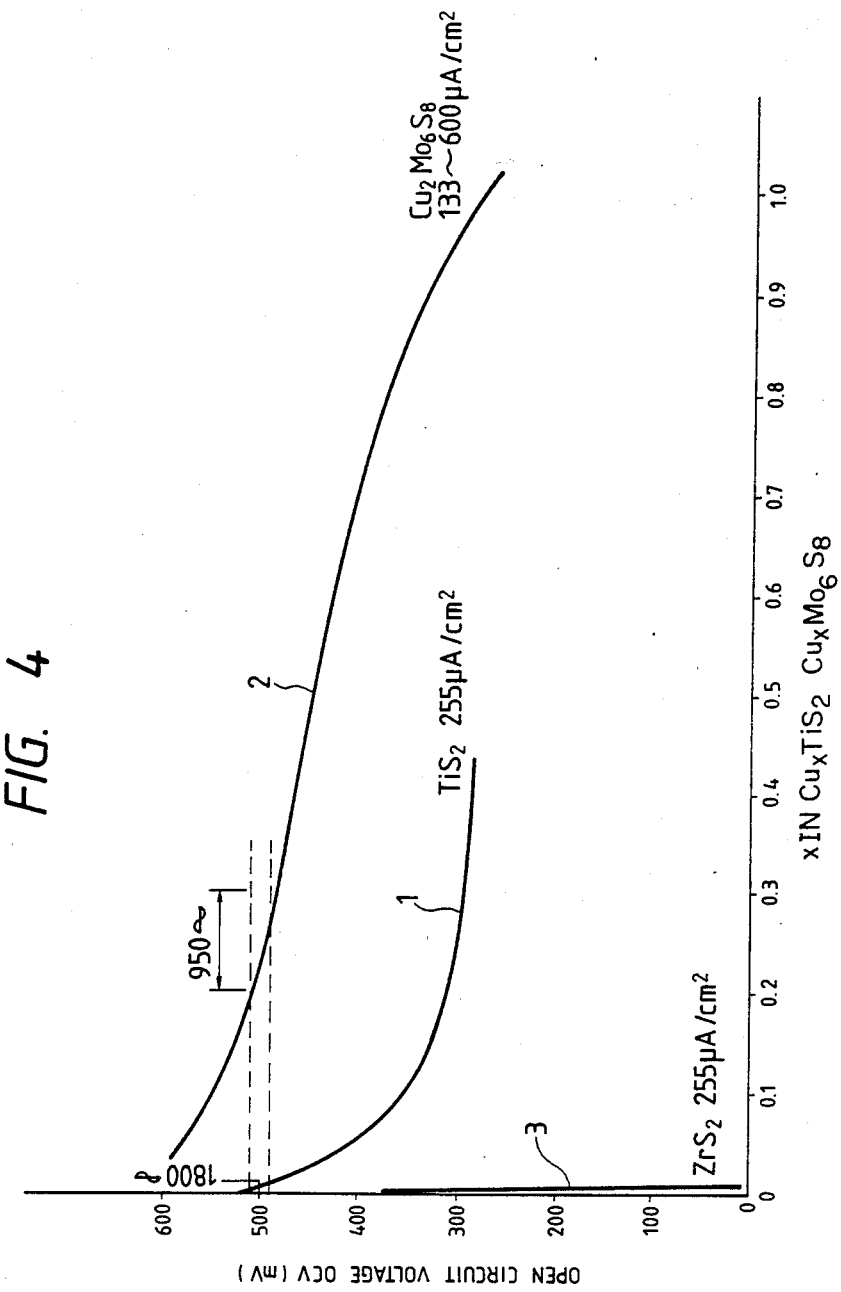
FIG. 4 is a graphical representation of an open circuit voltage in relation to the variation in x in $Cu_xTiS_2$ or $Cu_xMo_6S_8$.

The electrons are transmitted to the negative electrode 16 through the diode 24. The holes oxidize the Cu atoms into $Cu^+$ ions, releasing the ions into the the solid electrolyte 14. When $TiS_2$ is used, for example, as the n-type semiconductor layer compound, the $Cu^+$ ions are deintercalated from $Cu_xTiS_2$ by the action of light. The relation between the number of x in the $Cu_xTiS_2$ and the potential is shown in FIG. 4 as curve 1. When the concentration of the Cu atom in the $TiS_2$ layer decreases, the potential of $Cu_xTiS_2$ increases. In this manner, the photo-electrode of the photocell of the invention acts to deintercalate the Cu atoms in the layer by means of light.

Next, when the positive electrode 12 is made of a photo-electrode and a capacitive electrode which is formed, for example, of a Chevrel compound of the formula, $Cu_xMo_6S_{8-y}$ wherein $0 < x \leq 4$ and $0 \leq y \leq 0.4$, a decrease in concentration of the Cu atom, x, in the compound layer results in an increase of the potential of the Chevrel compound as is particularly shown in curve 2 of FIG. 4. Now, assuming that the $Cu_xTiS_2$ used as the photo-electrode releases, by the action of light, the Cu atom within a range of the curve 1 established between dotted lines, e.g. in the range of $0.005 \leq x \leq 0.01$, the potential of the $Cu_xTiS_2$ increases approximately by 20 mV. Accordingly, the capacitive electrode contacting the $Cu_xTiS_2$ photo-electrode, which is initially at the same potential as the photo-electrode, liberates Cu ions because of the potential difference of 20 mV. This causes the change of x in the range of $0.2 \leq x \leq 0.3$ for the curve 2 of FIG. 4, so that the Chevrel compound becomes the same as the $Cu_xTiS_2$ with respect to the potential. For the same potential change, the change of Cu atoms in the $Cu_xTiS_2$ is in the range of $0.005 \leq x \leq 0.01$, and the change in the $Cu_xMo_6S_{8-y}$ is $0.2 \leq x \leq 0.3$. The rate of the change is about 10 times as high as the rate in the case of $Cu_xTiS_2$. The n-type semiconductor layer compound used as the photo-electrode has the disadvantage that the capacitive density is small, but the disadvantage is overcome by the provision of the Chevrel compound having a three-dimensional skeletal structure. The capacitive density of the positive electrode can thus be remarkably increased.

The materials for the respective elements constituting the photocells of the invention are described.

The photo-electrode should comprise at least n-type semiconductors. Examples of the n-type semiconductor include $ZrS_2$, $ZrS_3$, $TiS_2$, $HfS_2$, $HfSe_2$, $SnS_2$, $MoS_2$, InSe, Si, Ge, $TiO_2$, GaAs, CdS, ZnO and mixtures or solid solutions thereof. Of these, n-type semiconductor layer compounds which have a hexagonal or rhombohedral crystal form are preferred. Examples such semiconductor layer compounds include $ZrS_2$, $ZrS_3$, $TiS_2$, $HfS_2$, $HfSe_2$, $SnS_2$, $MoS_2$, InSe, and mixtures or solid solutions thereof. Also, a mixture or solid solution of the formula, $(Ti_aZr_{1-a})S_{2-b}$, in which $0.5 \leq a \leq 0.75$ and $b \geq 0.1$ is preferred. The above mixture or solid solution is effective in increasing photo-charging and discharging currents.

The photo-electrode may be made of mixtures of the n-type semiconductors and conductive solid electrolytes used as a solid electrolyte layer, particularly when the cell is fabricated by molding. The solid electrolyte is used in an amount of not larger than 75 wt % of the mixture.

It will be noted that the term photo-electrode used herein means an electrode which is excited by application of light to generate electron-hole pairs and has the function of power generation. As will be apparent from the above description, this electrode is a layer comprising at least an n-type semiconductor defined above.

The capacitive electrode should be made of a compound having a three-dimensional structure capable of reversibly intercalating and deintercalating large amounts of metal atoms by the action of electrons and holes. The compound should contain metal atoms in the three-dimensional structure as layers, and the metal atoms may be called layer metal atoms. Examples of such compounds include Chevrel compounds such as $M_xMo_6S_{8-y}$ in which M is Cu or Ag, x is a value of $0 < x 23 4$ and y is a value of $0 \leq y \leq 0.4$, and vornites. Preferably, a Chevrel compound of the formula $Cu_xMo_6S_{8-y}$ in which $x=2.0$ or 2.3 when $y=0$, $x=1.9$ when $y=0.1$, or $x=1.2$ when $y=0.2$ to 0.4 is used. These Chevrel compounds may be used by mixing with ion conductive solid electrolytes described hereinafter. In this case, the amount of the solid electrolyte is up to 75 wt % of the mixture.

The materials of the photo-electrode and the capacitive electrode may be used as a mixture to form a positive electrode as particularly shown in FIG. 1. When the two electrodes are formed as in FIG. 2, the photo-electrode 12a formed on the capacitive electrode 12b should preferably have a thickness sufficient to absorb substantially all incident light in this layer without passing the light to the capacitive electrode. In practice, the thickness may be in the range of from 1 to 2 micrometers.

The solid electrolyte layer useful in the present invention has the function to successively accept cations formed by deintercalation of the capacitive electrode material such as of a Chevrel compound. The cations in the electrolyte layer are reduced by means of electrons supplied from a negative electrode. The solid electrolytes used for this purpose are high Ag or Cu-ion conductive compounds, Rb-containing compounds, and oxide compounds. Examples of the Rb-containing compounds include $RbAg_4I_5$, $RbCu_4I_{1.5}Cl_{3.5}$, $Rb_fK_{1-f}Cu_4I_{1.5}Cl_{3.5}$ wherein f is from 0.8 to 1 such as $K_{0.2}Rb_{0.8}Cu_4I_{1.5}Cl_{3.5}$, $Rb_{4.2}Cu_{15.8}I_{6.8}Cl_{13.2}$, $Rb_{4.2}Cu_{15.8}I_{7.0}Cl_{13.0}$, $Rb_{4.2}Cu_{15.8}I_{7.2}Cl_{12.8}$, $Rb_{4.2}Cu_{15.8}I_{7.4}Cl_{12.6}$, $Rb_{3.8}Cu_{16.2}I_{6.8}Cl_{13.2}$, $Rb_{3.8}Cu_{16.2}I_{7.0}Cl_{13.0}$, $Rb_{3.8}Cu_{16.2}I_{7.2}Cl_{12.8}$, $Rb_{3.8}Cu_{16.2}I_{7.4}Cl_{12.6}$, $Rb_{4.0}Cu_{16}I_{6.6}Cl_{13.4}$, $Rb_{4.0}Cu_{16}I_{6.8}Cl_{13.2}$, $Rb_{4.0}Cu_{16}I_{7.0}Cl_{13.0}$, $Rb_{4.0}Cu_{16}I_{7.2}Cl_{12.8}$, $Rb_{4.0}Cu_{16}I_{7.4}Cl_{12.6}$, $Rb_{4.0}Cu_{16}I_{7.6}Cl_{12.4}$, $Rb_{4.0}Cu_{16}I_{7.8}Cl_{12.2}$, $Rb_{4.0}Cu_{16}I_{8.0}Cl_{12.0}$, and mixtures thereof. Examples of the oxide compounds include $Ag_6I_4WO_4$ and the like. Of these the Cu ion conductive electrolytes are preferred, of which RbCuICl compounds are most preferred.

The negative electrode 16 is made of a metal such as Ag or Cu, or a mixture of electrolytic copper and $Cu_2S$ with or without a $Cu^+$ ion conductive solid electrolyte. These materials are suitably used in consideration of the types of solid electrolyte and electrodes used. Moreover, when the positive electrode is made of a photo-electrode of an n-type semiconductor and a capacitive electrode of a Chevrel compound, the negative electrode may be made of a p-type semiconductor and a Chevrel compound in order to improve the photoelectrochemical efficiency. The p-type semiconductor and the Chevrel compound may be mixed to form a one-layer electrode or may be formed as separate layers, respectively, similar to the positive electrode. The separate layers include a negative photo-electrode of the p-type semiconductor and a negative capacitive electrode of the compound having the capability of intercalation and deintercalation as set forth before. Examples of the p-type semiconductors include $FePS_3$, $Cu_3PS_4$, $Cu_{6-c}PS_5I$ in which $0<c<1$, polyacetylene, Si, Ge, GaAs, SiC, CdS, PbO, CdTe and mixtures thereof. The compounds for the capacitive electrode are those used as the positive capacitive electrode, including Chevrel compounds.

In addition, when a $Cu^+$ ion conductive solid electrolyte is added to the positive photo-electrode and the positive capacitive electrode, the two separate negative electrodes may also contain the solid electrolyte, respectively. In this case, the solid electrolyte in each electrode is generally in the range of up to 75 wt % of the electrode composition.

The current collectors for the positive and negative electrodes may be any conductive materials including metals, such as copper, graphite and the like. These materials may be used as a film or layer or a gauze. The current collector for the positive electrode to which light is irradiated should be formed on the positive electrode in a suitable form which allows light to pass into the positive electrode. Aside from the above-mentioned conductive materials, optically transparent conductive materials may be used such as $SiO_2$, Ag-In alloys and the like.

Since the photocell of the invention has the functions as a solar and secondary cell, preferable combinations of the materials for the respective elements constituting the photocell are present. These preferable combinations are now described.

One of such combinations includes a positive electrode of an n-type semiconductor layer compound and a copper Chevrel compound, a Cu ion conductive solid electrolyte, a negative electrode of Cu and/or $CuS_2$, a current collector of Cu for the negative electrode, and a current collector of graphite for the positive electrode. The positive electrode and the negative electrode are deposited on the layer of the solid electrolyte so that they are spaced from each other on one side of the solid electrolyte layer or provided on the opposite sides. As a matter of course, the n-type semiconductor and the copper Chevrel compound may be formed as one layer or separate layers. The Chevrel compound is of the formula $Cu_xMo_6S_{8-y}$ in which x is in the range of $0<x\leq4$ and y is in the range of from 0 to 0.4. Preferably, the respective elements are formed as films, for example, by sputtering or screen printing. The graphite current collector is formed along or at a periphery of the positive electrode so as to permit light to directly pass into the positive electrode. The mixing ratio of Cu and $Cu_2$ in the negative electrode is preferably in the range of 10:0 to 6:4. This combination is favorable because of good chargeability and reversibility.

In the case where the above combination is molded, the $Cu^+$ ion conductive solid electrolyte is added to the positive electrode (whether one layer or separate layers), and the negative electrode. This is because the electrochemical reaction is facilitated by increasing the contact area of the electrode material and the electrolyte. The solid electrolyte is used in an amount of from 25 to 75 wt % for each of the electrodes.

Preferably, the n-type semiconductor layer compound used in the combination is of the formula, $(Ti_aZr_{1-a})S_{2-b}$ in which $0.5\leq a\leq0.75$ and $b\geq0.1$. When the photocell is of the molding type, the solid electrolyte is also added to this layer compound.

Another combination includes a positive photo-electrode of a mixture of an n-type semiconductor and a $Cu+$ ion conductive solid electrolyte, a positive capacitive electrode of a mixture of an intercalative or deintercalative compound and the $Cu^+$ ion conductive solid electrolyte provided in contact with the positive photo-electrode, a negative photo-electrode of a mixture of a p-type semiconductor and the $Cu^+$ ion conductive solid electrolyte, a negative capacitive electrode provided in contact with the negative photo-electrode and made of a mixture of an intercalative compound and the $Cu^+$ ion conductive solid electrolyte or a mixture of Cu and $CuS_2$ and the $Cu^+$ ion conductive solid electrolyte, and an electrolyte layer consisting of the $Cu^+$ ion conductive solid electrolyte in contact with the positive and negative capacitive electrodes which are spaced apart from each other. In this case, the n-type semiconductor for the positive photo-electrode is a compound such as $ZrS_2$, $ZrS_3$, $HfS_2$, InSe or a mixture thereof. The p-type semiconductor is a compound selected from $Cu_3PS_4$, $Cu_{6-c}PS_5I$ wherein $0<c<1$. Preferably the positive and negative capacitive electrodes are both made of a Chevrel compound of the formula, $Cu_xMo_6S_{8-y}$ in which when $y=0$, $x=2.3$, when $y=0.1$, $x=1.9$, and when $y=0.2$ to $0.4$, $x=1.2$. In this connection, the negative capacitive electrode may be preferably made of a mixture of Cu and $Cu_2S$ at a mixture ratio by weight of 6:4. Alternatively, the positive capacitance electrode may be made of a compound of $Cu_dTiS_{2-e}$ in which d is a value of from 0 to 0.22 and e is a value of from 0 to 1.7 and the negative electrode made of the Chevrel compound defined above.

In this embodiment, the positive and negative electrodes are so arranged that the respective photo-electrodes have a wide band gap, low electron and ion conductivities, and the respective capacitive electrodes have, on the contrary, a narrow band gap. In this sense, the positive photo-electrode is constituted of an n-type semiconductor having a value of Eg of 1.7 to 2.1 eV, e.g. $ZrS_2$ (Eg=1.7 eV), $ZrS_3$ (Eg=2.1 eV), $HfS_2$ (Eg=2.0 eV) and InSe (Eg=2.1 eV). The negative photo-electrode is made of a p-type semiconductor having a band gap of about about 2 eV, i.e. $CuPS_4$ (Eg=−2 eV) and $Cu_{6-c}PS_5I$ (Eg=2.1 eV). The capacitive electrodes are so formulated that the electromotive force at the time of completion of discharge becomes zero, making possible rapid charge and discharge. Further, when the positive capacitive electrode is made of $Cu_dTiS_{2-e}$ and the negative capacitive electrode is made of the defined copper Chevrel compound, repeated charge and discharge life cycles are prolonged.

The photocells are generally fabricated by press molding or by a printing technique or by sputtering, as is particularly described in the examples, without resorting to any specific techniques.

Fabrication of a photocell by press molding is described with reference to FIG. 5.

A mold 40 is first provided, including a bottom plate 42 and a top plate 44 which are fixed with bolts and nuts 46 at opposite end sides. A gauze such as a copper gauze is placed on the mold 10 as a current collector 20 for a negative electrode 16. An active powder for the negative electrode 16 is placed on the current collector 20 and preliminarily pressed. Subsequently, an electrolyte and active materials for a positive capacitive electrode 12b and a positive photo-electrode 12a are successively placed and preliminarily pressed. The resultant body is press molded at a predetermined pressure. Finally, a current collector for the positive electrode having an opening 34 is attached to the electrode 12a along with leads 26, 28 to obtain a photocell 10. This photocell is a pellet-type photocell.

FIG. 6 shows another type of photocell formed by printing and sputtering techniques, in which a plurality of photocells are connected in series but each cell construction is fundamentally similar to the photocell of FIG. 2. Fabrication of the photocells is described.

A paste of a material for the positive electrode current collector 18, such as graphite, is screen printed on the glass substrate 30 except for a portion of the substrate through which light is passed. The applied paste is baked. As a matter of course, sputtering may be used instead of the printing to form a several micrometer thick film. An active material for the photo-electrode 12a such as a conductive n-type semiconductor is sputtered on the gass substrate, for example, by magnetron sputtering, followed by sputtering an active material to form the capacitive electrode 12b on the electrode 12a. Next, an ion conductive solid electrolyte is formed on the capacitive electrode 12b to cover one side of the current collector 18 and the electrodes 12a, 12b as shown. Subsequently, an active material is sputtered to form the negative electrode 16 on the solid electrolyte layer 14 as shown. Further, a metal such as Cu is vacuum evaporated to cover part of the solid electrolyte 14 and the negative electrode 16. A resin cover 36 such as an epoxy resin may be formed to protect the resultant photocell 10.

This photocell is particularly suitable for fabrication of a thin and small-size cell although a thick photocell may be made by the above procedure.

Figure 7:
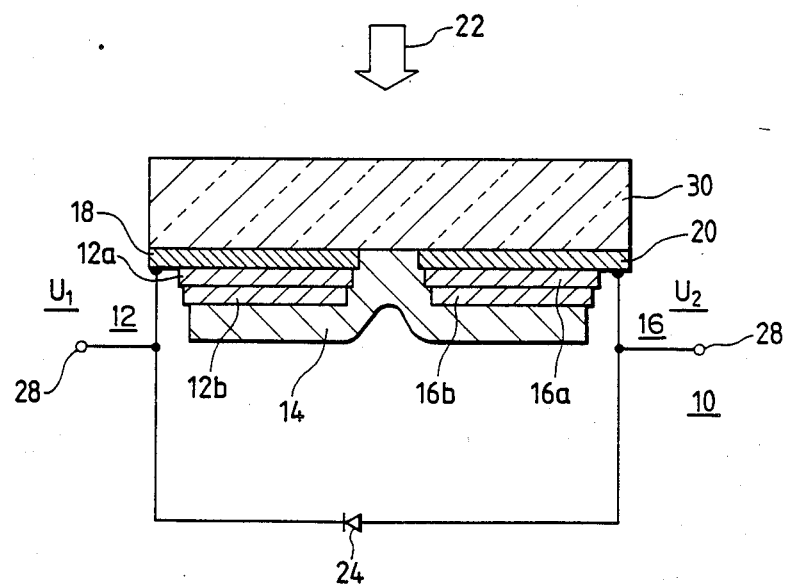
FIG. 7 is a schematic sectional view of a photocell according to a still further embodiment of the invention.

FIG. 7 shows a further embodiment of a photocell 10 in which the positive electrode 12 and the negative electrode 16 are in side-by-side relation. The photocell 10 includes the transparent substrate 30 having a positive electrode unit $U_1$ and a negative electrode unit $U_2$. The unit $U_1$ includes the current collector 18 and the positive electrode 12 formed in this order on the left side of the substrate 30 as viewed in FIG. 7. Similarly, the unit $U_2$ includes the current collector 20 and the negative electrode 16 formed in this order on the right side of the substrate 30. The units $U_1$ and $U_2$ are covered on the positive and negative electrode with a common solid electrolyte layer 14. In FIG. 7, the positive electrode 12 is illustrated as a two-layer construction including the photo-electrode 12a made of an n-type conductive semiconductor and the capacitive electrode 12b made of an intercalative or deintercalative compound. The negative electrode 16 includes a photo-electrode 16a made of a p-type conductive semiconductor and a capacitive electrode 16b made of an intercalative or deintercalative compound. Of course, the positive and negative electrodes 12 and 16 may be, respectively, formed as one layer as is shown in FIG. 1.

The transparent substrate may be made, for example, of glass or transparent plastic resins.

The n-type and p-type semiconductors are, respectively, those defined in the foregoing. For imparting conductivity to the semiconductors, donors and acceptors are preferably doped to produce the n-type and p-type semiconductors, respectively. By the doping, conductive ions in the solid electrolyte are more unlikely to be intercalated.

The photocell of this embodiment can be fabricated as illustrated with respect to FIG. 6 and is particularly suitable for making a thin photocell. For instance, the thicknesses of the positive and negative photo-electrodes 12a, 16a are each on the order of several hundred angstroms, e.g. about 300 angstroms, and those of the positive and negative capacitive electrodes are on the order of several thousand angstroms, e.g. about 2000 angstroms. The solid electrolyte layer is formed in a thickness of 5000 to 30,000 angstroms.

The working principle of this photocell is described in which $Cu_2Mo_6S_8$ is used as the respective capacitive electrodes.

When the photocell is exposed to excitation light 22 of FIG. 7, a charging operation starts, in which electrons and holes are produced in the n-type semiconductor electrode 12a. For the formation of the electrons and holes, it is necessary that the electrode 12a absorbs light having an energy higher than the band gap.

The electrons formed in the n-type semiconductor electrode 12a are transmitted through the diode 24 to the negative electrode 16. On the other hand, the positive holes formed in the n-type semiconductor electrode 12a are transferred to the electrode 12b of the Chevrel compound in which the Cu atoms are oxidized to produce $Cu^+$ ions. The $Cu^+$ ions are deintercalated from the electrode film 12b are released into the solid electrolyte layer 14.

In the negative electrode 16, the p-type semiconductor photo-electrode 16a absorbs light with energy higher than the band gap to produce electrons and positive holes. The positive holes move through the diode 24 into the positive electrode 12. The electrons are transferred to the negative capacitive electrode 16b and then to the solid electrolyte layer 14 where the released $Cu^+$ ions are reduced into Cu atoms and successively intercalated into the electrode 16b of the Chevrel compound. In the presence of the excitation light irradiation, the intercalation condition continues and thus charging is effected.

Figure 8:
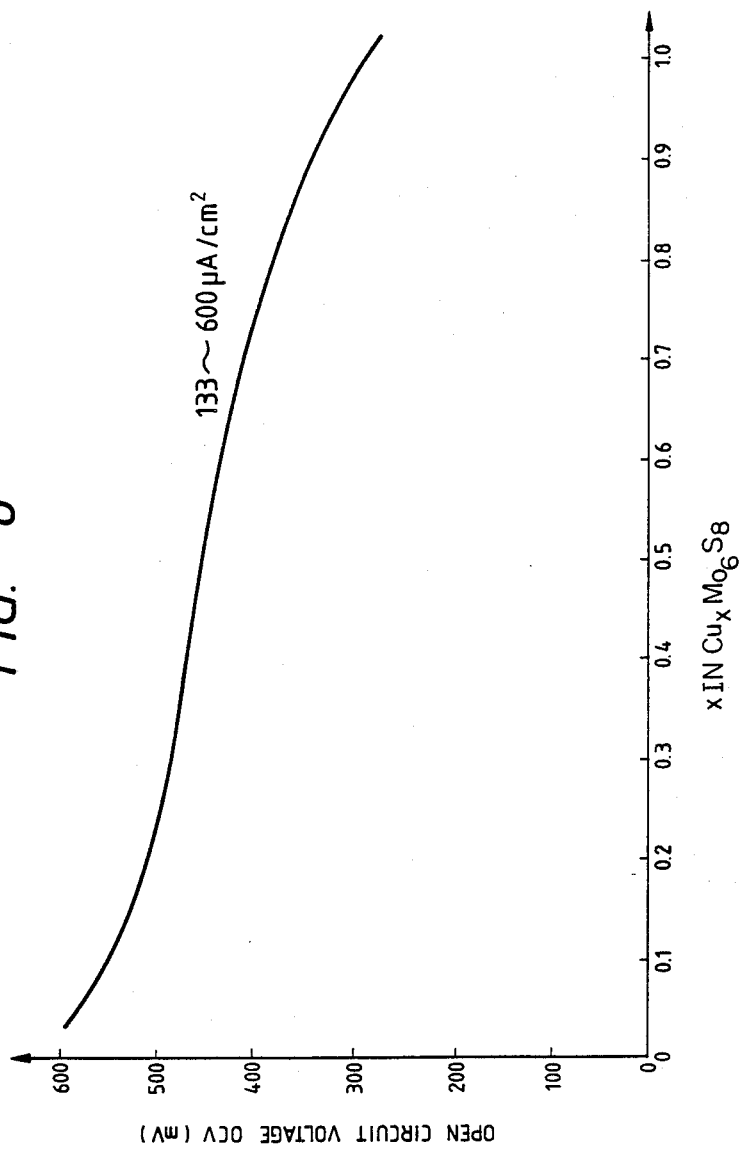
FIG. 8 is a graphical representation of a potential or an open circuit voltage in relation to the variation in a concentration of Cu atom, x, in a Cu-containing Chevrel compound.

In the capacitive electrodes, the $Cu_2Mo_6S_8$ Chevrel compound has been used. If a Chevrel compound of the formula, $Cu_xMo_6S_{8-y}$ in which $0.1 \leq y \leq 0.4$, is used, the potential in the compound varies as shown in FIG. 8. More particularly, when the concentration of Cu atoms, x, in the compound decreases, the potential of the Chevrel compound increases. The Chevrel compound is a layer compound having a three-dimensional skeletal structure and has the capability of reversible intercalation and deintercalation.

The discharge of an electric current to a load (not shown) connected to the positive and negative current collectors is carried out in the following manner.

The Cu atoms intercalated in the Chevrel compound of the capacitive electrode 16b liberate electrons toward the current collector 20 whereupon the Cu atoms are converted into $Cu^+$ and are thus deintercalated and released into the solid electrolyte layer 14. The $Cu^+$ ions released in the solid electrolyte layer 14 are reduced into Cu atoms by reception of electrons from the positive electrode 12. The Cu atoms are then intercalated in the Chevrel compound of the positive capacitive electrode 12b, thus returning to the state prior to the charging. Thus, the cell is discharged.

The photocell 10 of FIG. 7 is very effective particularly for rapid charge and discharge operations when the materials for the positive and negative photo-electrodes and capacitive electrodes are properly selected. The positive and negative photo-electrodes are, respectively, formed of n-type and p-type semiconductors exhibiting a high band gap, and the positive and negative capacitive electrodes are formed of materials exhibiting a low band gap, respectively. The n-type semiconductors useful for this purpose are, as mentioned before, those compounds having a band gap of 1.7 to 2.1 eV, such as $ZrS_2$, $ZrS_3$, $HfS_2$, InSe and mixtures thereof. The p-type semiconductors are those having a band gap of about 2 eV and including $CuPS_4$ or $Cu_{6-c}PS_5I$ in which $0 < c < 1$.

Both capacitive electrodes are so controlled in composition that the electromotive force at the completion of discharge becomes zero. To this end, the negative capacitive electrodes are both formed of a copper Chevrel compound of the formula $Cu_xMo_6S_{8-y}$ in which $x = 2.3$ when $y = 0$, $x = 1.9$ when $y = 0.1$, and $x = 1.2$ when $y = 0.2$ to 0.4. Alternatively, the positive capacitive electrode may be formed of the above copper Chevrel compound and the negative capacitive electrode is formed of a mixture of Cu and $Cu_2S$ at a mixing ratio by weight of 6:4. Still alternatively, the positive capacitive electrode may be formed of a compound of the formula, $Cu_dTiS_{(1-e)}$, in which d and e have, respectively, the same meanings defined before, and the negative capacitive electrode is formed of the above-defined Chevrel compound.

Figure 9A:
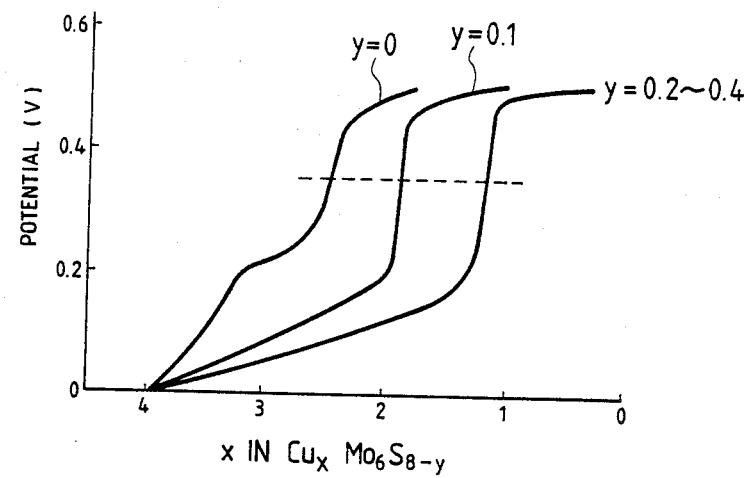
FIGS. 9a and 9b are, respectively, graphical representations of the potential in relation to the variation in a concentration of Cu, x, of $Cu_xMo_6S_{8-y}$ and $Cu_xTiS_{1.95}$.
Figure 9B:
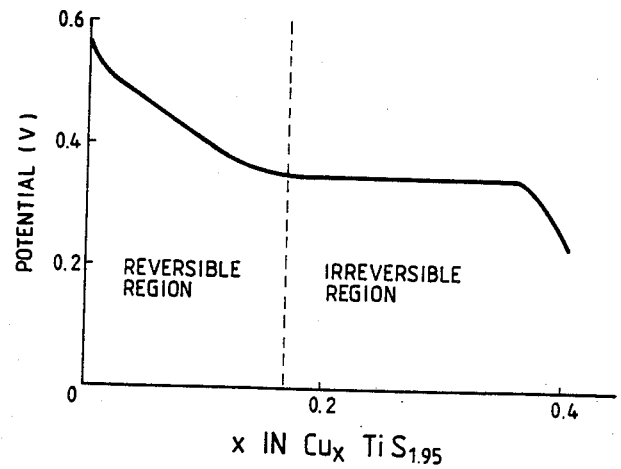

How the above combinations for the positive and negative capacitive electrodes are determined is illustrated with respect to a combination of the copper Chevrel compound and $Cu_dTiS_{2-e}$. The relation between x in $Cu_xMo_6S_{8-y}$ and the potential for different values of y is shown in FIG. 9a when the above Chevrel compound is used as a negative capacitive electrode. The relation between x in $Cu_xTiS_{1.95}$ and the potential is shown in FIG. 9b when this compound is used as a positive capacitive electrode. The limit where Cu is reversibly intercalated in the positive capacitive electrode is about 0.17 as indicated in FIG. 9b as a dotted line. It will be seen from FIG. 9a that in order that the potential of the negative capacitive electrode exceeds this value, it is necessary that the composition of the positive capacitive electrode is determined as $Cu_{0.17}TiS_{1.95}$ and the composition of the negative capacitive electrode be determined as $Cu_{1.1}Mo_6S_{7.6}$ at the time of fabrication of the photocell. The photocell suffers little deterioration in capacity after complete discharge.

Figure 10:
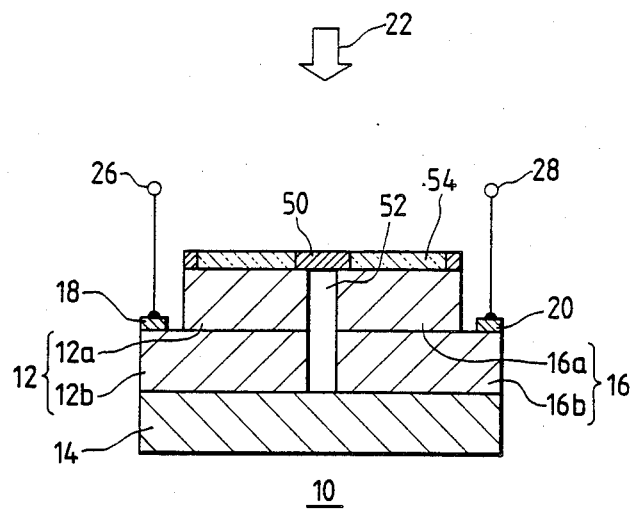
FIGS. 10 to 12 are, respectively, schematic views of photocells according to further embodiments of the invention.

FIG. 10 shows another embodiment of a photocell according to the invention. This photocell 10 is similar to the photocell of FIG. 7, but a space 52 is formed between the positive electrode 12 and the negative electrode 16. In addition, a common conductive electrode 50 is placed along the margin of the positive photo-electrode 12a and the negative photo-electrode 16a. A substantial part of the surface of each photo-electrode is covered with a transparent member 54 or is exposed to receive the light 22. It will be noted that the space 52 may be filled with an insulating material.

In this arrangement, the positive capacitive electrode 12b and the solid electrolyte layer 14 and the negative capacitive electrode 12b constitute a secondary battery or cell. If a copper Chevrel compound is used as both capacitive electrodes, the amount of Cu in the Chevrel compound in the positive electrode should be smaller than the amount of Cu in the negative electrode, by which the positive electrode becomes positive in potential. This is because the copper Chevrel compound becomes lower in potential at a larger content of Cu as is particularly shown in FIG. 9a.

The photocell of FIG. 10 can be charged by irradiation of light as described hereinbefore, after which when a load (not shown) is connected between the terminals 26 and 28 for discharge, the electric current flows from the positive capacitive electrode 12b through the terminal 26, the load and the terminal 28 to the negative capacitive electrode 16b. At the same time, when light is irradiated, the electric current flows from the positive photo-electrode 12a through the positive capacitive electrode 12b, the terminal 26, the load, the terminal 28, the negative capacitive electrode 16b, the negative photo-electrode 16a, and the conductive electrode 50 to the positive photo-electrode 12a to compensate the discharge.

Figure 11:
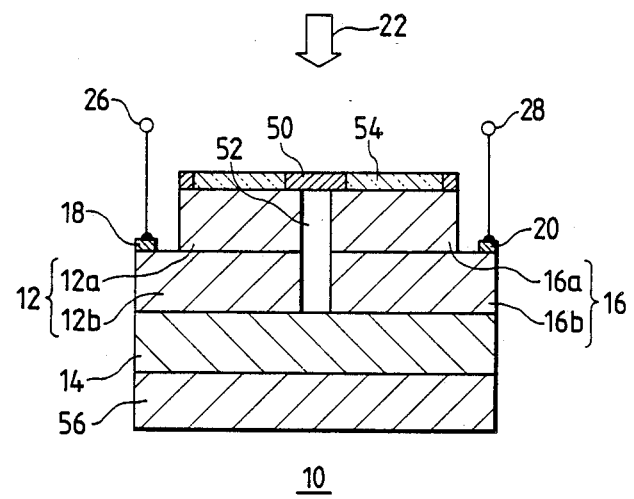

In order to make a more uniform flow of cations such as $Cu^+$ ions in the solid electrolyte layer 14, a back electrode 56 may be formed on the solid electrolyte layer 14 as shown in FIG. 11. The back electrode 56 may be made of a mixture of a copper Chevrel compound and the solid electrolyte used in the layer 14.

Figure 12:
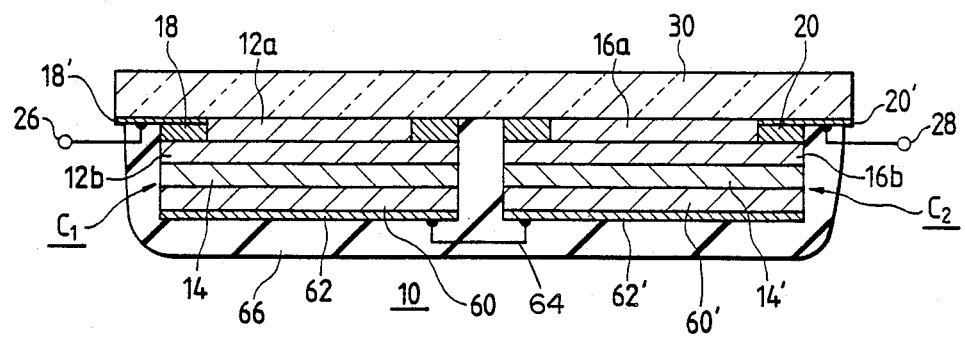

FIG. 12 shows another embodiment of a photocell according to the invention. The photocell 10 includes positive and negative electrode cells $C_1$ and $C_2$ formed on one side of a transparent substrate 30. The positive electrode cell $C_1$ is a positive cell comprising an n-type semiconductor photo-electrode 12a received in an opening of a current collector 18, a positive capacitive electrode 12b, a $Cu^+$ ion conductive electrolyte layer 14, a Cu electrode 60, and a current collector 62 for the Cu electrode deposited on one side of the transparent substrate in this order. The current collector 18 has an extension 18' for external connection. The negative electrode cell $C_1$ includes a p-type semiconductor photo-electrode 16a received in an opening of a current collector 20, a negative capacitive electrode 16b, a $Cu^+$ ion conductive solid electrolyte layer 14', a Cu electrode 60' and a current collector 62' for the electrode 60' deposited on the one side of the transparent substrate in side-by-side relation with the positive electrode cell $C_1$. The positive and negative electrode cells $C_1$ and $C_2$ are connected with a conductive wire 64. Reference numeral 66 is a cover for the cell 10. The Cu electrodes 60, 60' are preferably made of a mixture of electrolytic copper, $Cu_2S$ and the solid electrolyte used as the solid electrolyte layer. The positive and negative capacitive electrodes are preferably each made of a mixture of a Cu Chevrel compound and the $Cu^+$ ion conductive solid electrolyte. The Chevrel compound is preferably of the formula, $Cu_2Mo_6S_{8-y}$ in which $0 \leq y \leq 0.4$. The combinations of n-type semiconductors such as n-$TiO_2$, n-CdS, n-InSe, n-$ZrS_3$, n-$ZrS_2$ and mixtures thereof and p-type semiconductors such as p-GaP, p-InSe, p-$Cu_{6-c}PS_5I$ in which x is $0 < c < 1$, p-$Cu_3PS_4$ and mixtures thereof are preferably used as the respective photo-electrodes. The $Cu^+$ ion conductive solid electrolyte is one which has been defined before including $RbCu_4I_5Cl_{3.5}$, or $Ru_fK_{1-f}X_5$ in which $0.8 \leq f \leq 1$ and X has the same meaning as defined above. The current collector in contact with the p-type and n-type semiconductor photo-electrodes is preferably made of graphite.

The photocell of this embodiment is advantageous in that the optical charging current and discharging current can be made large with a high density of capacity.

The present invention is described in more detail by way of examples.

EXAMPLE 1

1.0 g of a powder mixture of Cu, $Cu_2S$ and $RbCu_4I_{1.5}Cl_{3.5}$ at a mixing ratio by weight of 19:4:5 was placed as a negative electrode material in a mold and preliminarily pressed at 200 kg/cm$^2$. Further, 0.4 g of RbCu$_4$I$_{1.5}$Cl$_{3.5}$ was added to the mold and preliminarily pressed at 100 kg/cm$^2$, followed by further addition of 0.1 g of a powder mixture of Cu$_2$Mo$_6$S$_{7.6}$ and RbCu$_4$I$_{1.5}$Cl$_{3.5}$ at a mixing ratio by weight of 4:1 and preliminary pressing at 200 kg/cm$^2$. Subsequently, 0.1 g of a powder mixture of TiS$_2$ and RbCu$_4$I$_{1.5}$Cl$_{3.5}$ at a mixing ratio by weight of 1:1 was added, followed by press molding at a pressure of 3 tons/cm$^2$ to obtain a pellet. A copper sheet was attached to the negative electrode of the pellet and a graphite current collector having an opening for light irradiation was attached to the positve electrode. If a transparent electrode such as of In$_2$O$_3$(Sn) is used instead of the graphite current collector, the opening for the light irradiation is not necessary.

A diode for optical charging was connected as an external circuit as shown in FIG. 1 to obtain a solid-state photocell. The open circuit terminal voltage was 0.5 volts.

A plurality of the photocells connected in series can increase the terminal voltage.

An electric current of 1 mA at a peak period was readily obtained. 1000 or more charging and discharging cycles were possible.

EXAMPLE 2

0.1 g of a powder mixture of TiS$_2$ used as a photo-electrode material, Cu$_2$Mo$_6$S$_8$ particles as a capacitive electrode material and RbCu$_4$I$_{1.5}$Cl$_{3.5}$ at a mixing ratio by weight of 1:1:0.5 was preliminarily pressed. 0.4 g of RbCu$_4$I$_{1.5}$Cl$_{3.5}$ was placed on the first layer and preliminarily pressed, followed by placing a powder mixture of of Cu, Cu$_2$S and RbCu$_4$I$_{1.5}$Cl$_{3.5}$ at a mixing ratio by weight of 19:4:5 and press molding under a pressure of 3 tons/cm$^2$ to obtain a pellet. The pellet was subsequently processed in the same manner as in Example 1 to obtain a solid-state secondary photocell. The photocell could be discharged over 50 hours at an open-circuit voltage of 0.55 volts and a current density of 500 microamperes/cm$^3$. Also, the charging and discharging cycles under the same conditions as indicated above reached 1000 cycles or over. The fabrication of the photocell was very easy.

EXAMPLE 3

Fabrication of a photocell of the type as shown in FIG. 2 was described.

An ITO film used as a current collector 18 for a positive electrode 12 was formed on a glass substrate 30. On the current collector 18 were successively formed a ZrS film as an n-type semiconductor layer compound layer 12a and a Cu$_2$Mo$_6$S$_8$ film as a Chevrel compound layer 12b having a three-dimensional structure, a Cu-Cu$_2$S mixture film as a negative electrode 16, and a Cu film as a current collector 20 by electron beam vacuum evaporation to obtain a photocell. This photocell had an open circuit terminal voltage of 0.55 volts. In this photocell, the capacity could be varied by changing the thickness of the Chevrel compound film.

The photocell is advantageous in the fabrication of a very thin photocell having, for example, a total thickness of several micrometers.

In order to increase the open circuit voltage, the photocells of the above arrangement should be connected in series.

EXAMPLE 4

Figure 5:
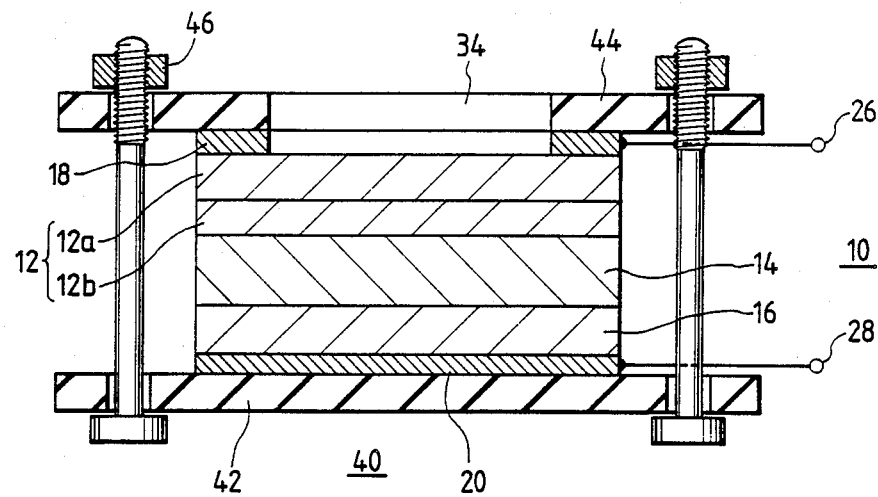
FIG. 5 is a schematic sectional view illustrating the fabrication of a photocell by press molding.

A photocell was fabricated using a mold as shown in FIG. 5 in which the cell comprised in order, a negative electrode made of electrolytic copper powder, a Cu$_2$S and a Cu$^+$ ion conductive solid electrolyte, and a positive photo-electrode made of a mixture of TiS and ZrS$_2$.

A copper gauze having 100 mesh openings and a diameter of 13 mm and used as a current collector was placed on the bottom of a mold having a diameter of 13 mm. On the copper gauze was uniformly placed a mixture of active materials for a negative electrode composed of 0.096 g of electrolytic copper powder, 0.064 g of Cu$_2$S and 0.04 g of RbCu$_4$I$_{1.5}$Cl$_{3.5}$ as a Cu$^+$ ion conductive solid electrolyte, followed by preliminary pressing at a pressure of 100 kg/cm$^2$. Thereafter, 0.2 g of the solid electrolyte was placed and preliminarily pressed, followed by placing a powder mixture of 0.01 g of the solid electrolyte used above and 0.04 g of each of mixtures of TiS and ZrS$_2$ at mixing ratios by weight of (A) 0:1, (B) 0.25:0.75, (C) 0.50:0.50, (D) 0.75:0.25, (E) 1:0, and a solid solution of TiS and ZrS$_2$ at a mixing ratio by weight of (F) 0.75:0.25. The entire body in the mold was press molded at a pressure of 3 tons/cm$^2$ to obtain a pellet.

The pellet was contacted on the positive photo-electrode side with a graphite current collector of a disk form having an opening with a diameter of 10 mm through which light was to be irradiated to obtain a photocell. The photocell was charged at a constant voltage of 0.55 volts and then discharged to a final voltage of 0.3 volts at a current of 10 microamperes to obtain a discharge curve. Thereafter, the photocell was irradiated with light from a 500 W xenon lamp at a distance from 25 cm and subjected to measurement of a photo-charging current 20 seconds after the irradiation. The photo-charging current was determined by light irradiation under conditions where the dark current became zero at 0.55 volts and 0.3 volts.

Figure 13:
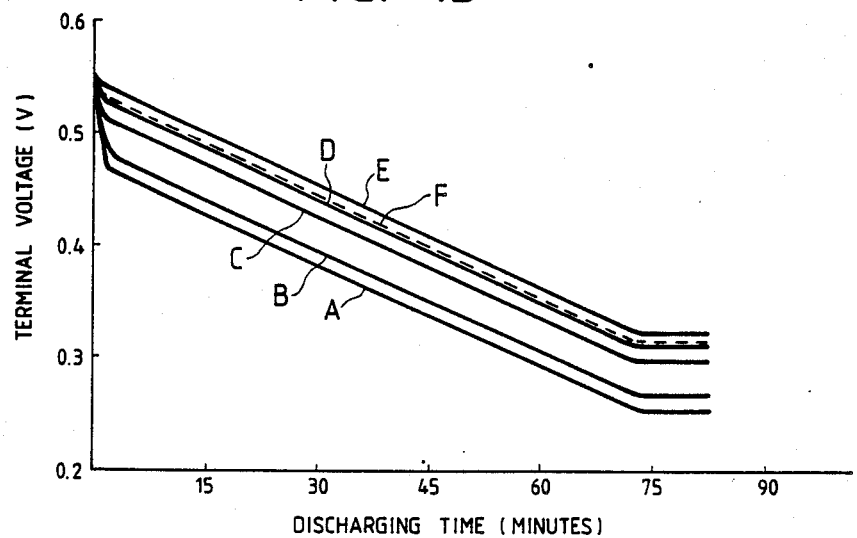
FIG. 13 is a graphical representation of the terminal voltage of a photocell in relation to the variation in discharge time.
Figure 14:
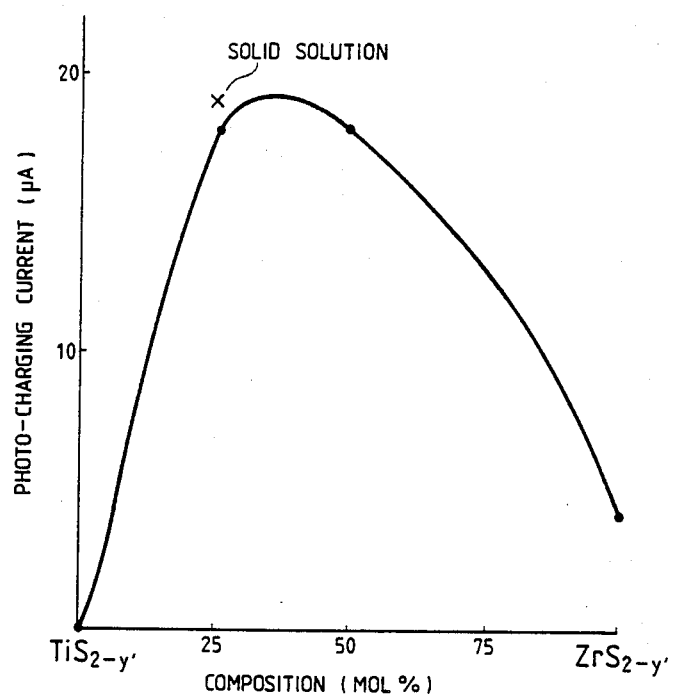
FIG. 14 is a graphical representation of a photo-charging current in relation to the variation in composition of a positive photo-electrode.

The results are shown in FIGS. 13 and 14. From the figures, it will be seen that when the value of a in (Ti$_a$Zr$_{1-a}$)S$_{2-b}$ is in the range of $0.5 \leq a \leq 0.75$, the photo-charging current is high with a good discharge curve. When the value of a is larger than 0.75, the discharge curve is good but photo-charging is not possible when the cell is discharged to 0.3 volts. This is considered for the reason that the band gap becomes too small. When the value of a is smaller than 0.50, the photo-charging current becomes small with a low discharging curve. This is considered to result from the low electron and Cu$^+$ ion conductivities of the positive photo-electrode.

EXAMPLE 5

The general procedure of Example 4 was repeated except that an active material for the positive capacitive electrode was replaced by a powder mixture of 0.04 g of the Cu$^+$ conductive electrolyte and Cu$_2$Mo$_6$S$_{8-y}$ in which y=0 (G), 0.2 (H), 0.2 (I) or 0.4 (J), and an active material was replaced by a powder mixture of 0.04 g of TiS and ZrS$_2$ at a mixing ratio by weight of 0.75:0.25, thereby obtaining pellets. The respective pellets were formed on the positive photo-electrode with a graphite disk current collector having an opening with a diameter of 10 mm current collector, thereby obtaining photocells. These photocells were charged at a constant voltage of 0.55 volts. Thereafter, these photocells and the photocell of Example 4 using the positive photo-electrode (D), which was free of the positive capacitive electrode, were each discharged to a final voltage of 0.3 volts at a constant current of 200 microamperes, 500 microamperes or 1 milliampere to determine a discharge curve. Finally, a photo-charging current at 0.3 volts was determined for the respective samples.

Figure 15:
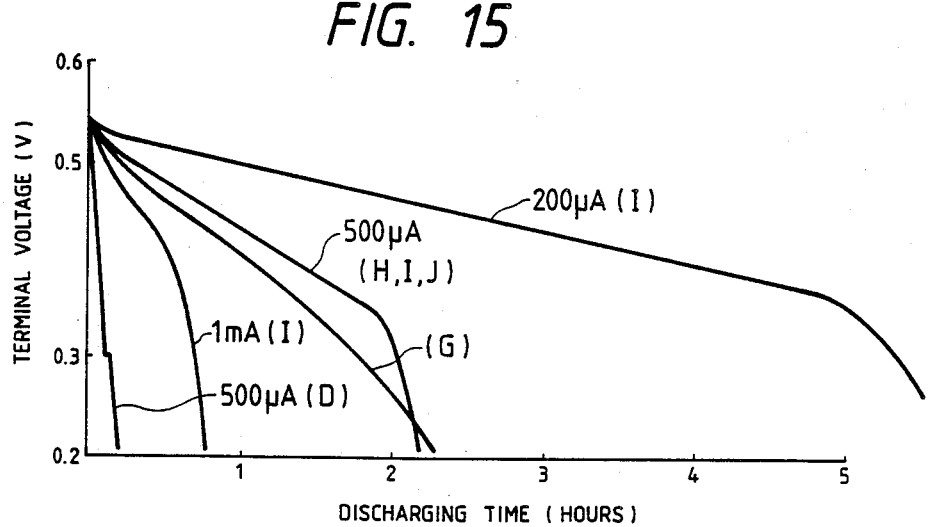
FIG. 15 is a graphical representation of the terminal voltage in relation to the variation in charging time for different capacitive positive electrodes.
Figure 16:
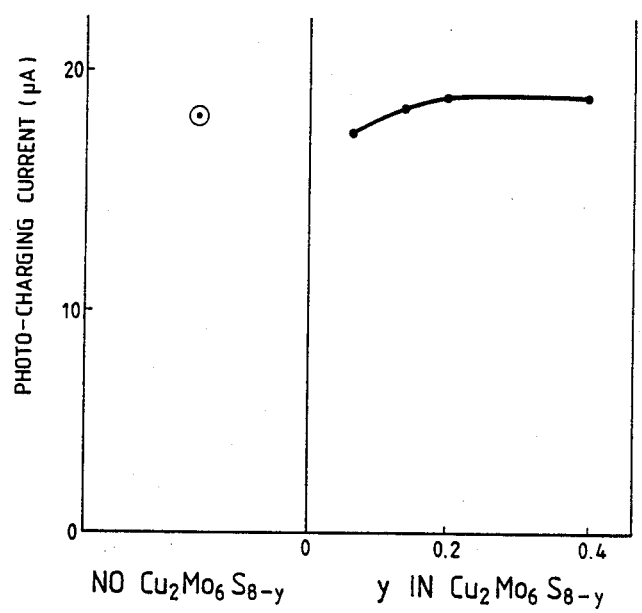
FIG. 16 is a graphical representation of a photo-charging current in relation to the variation in the value of y in $Cu_2Mo_6S_{8-y}$ used as a capacitive positive electrode.

The results are shown in FIG. 15 for the discharging curve and in FIG. 16 for the photo-charging current. As will be apparent from the figures, the discharge capacity increases by approximately ten times greater when the positive capacitive electrode is formed. This leads to a smaller degree of the lowering of the photo-charging current. It will be also found that when the value of y in the $Cu_2Mo_6S_{8-y}$ used as the positive capacitive electrode is zero, the discharging capacity becomes smaller.

From the above, it is preferred that when $Cu_x Mo_6S_{8-y}$ is used as the positive capacitive electrode, $x=2$, $0.1 \leq y \leq 0.4$. The capacity density increases when the positive photo-electrode and the positive capacitive electrode are separately formed. With $(Ti_a Zr_{1-a})S_{2-b}$ it is preferred that $0.5 \leq a \leq 0.75$ and $b \geq 0.1$.

EXAMPLE 6

Figure 6A:
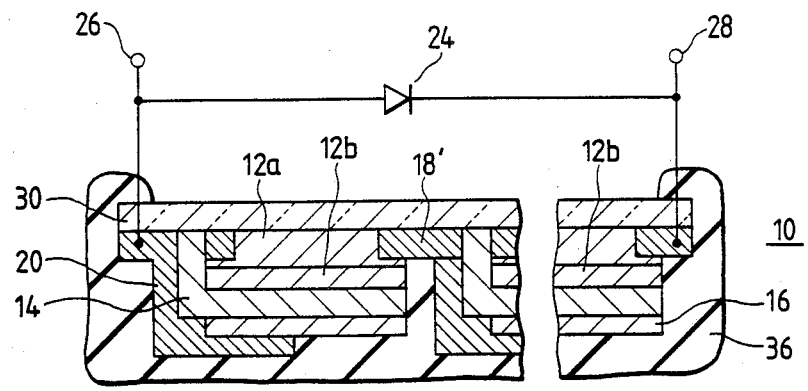
FIGS. 6a and 6b are, respectively, schematic sectional and plan views of a thin photocell according to a further embodiment of the invention which are also used to illustrate fabrication.
Figure 6B:
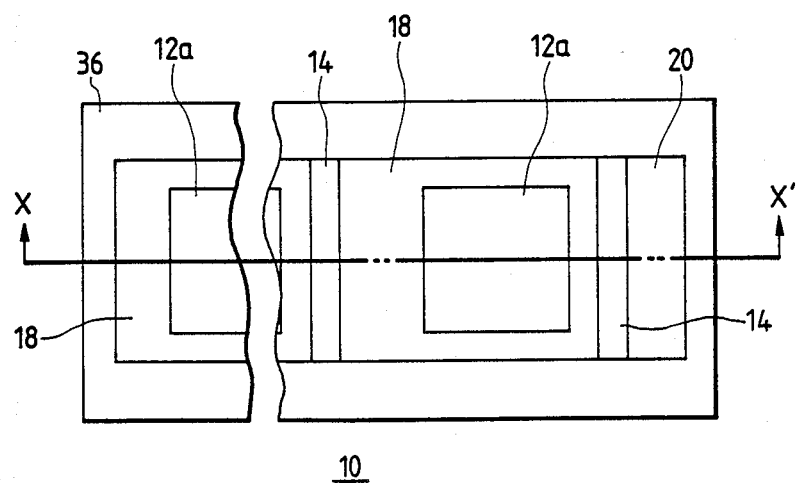

This example illustrates fabrication of a photocell of the type as shown in FIG. 6a and 6b.

A graphite paste was screen printed on a glass substrate in a pattern which permitted light to be appropriately irradiated, and baked at 200° C. for 30 minutes to form a current collector for the positive electrode. This current collector may be formed, instead of the screen printing, by sputtering in a thickness of approximately 2 micrometers with a similar current collecting effect.

Thereafter, a mixture of TiS and $ZrS_2$ at a mixing ratio by weight of 0.75:0.25 was subjected to magnetron sputtering to form a pattern of a positive photo-electrode with a thickness of (K) 5000 angstroms, (L) 1 micrometer or (M) 2 micrometers. Further, $Cu_2Mo_6S_{7.8}$ used as a positive capacitive electrode was deposited by magnetron sputtering on the photo-electrode in a thickness of 1 micrometer. $RbCu_4I_{1.5}Cl_{3.5}$ used as an electrolyte was vacuum deposited in a thickness of about 10 micrometers, followed by deposition of a mixture of Cu and $Cu_2S$ at a mixing ratio by weight of 0.6:0.4 by magnetron sputtering to form a negative electrode in a thickness of about 1 micrometer. A Cu current collector was vacuum deposited on the negative electrode in a thickness of 1 micrometer as shown in FIG. 6 to complete the connection of the cells.

Finally, an epoxy resin protective layer was formed to cover the cells. Thus, there was obtained a photocell composed of four unit cells connected in series, each of which had a size of 11 mm square with a light-permeable portion size of 8.9 mm square.

The photocell was connected with a 2.2 V Zener diode as shown in FIG. 6 and subjected to the following test. The reason why the Zener diode was used is to inhibit overcharge and permit photo-charging in the absence of any load. It will be noted that the overcharge takes place at 2.2 V or more for the four unit cells to shorten the life of the photocell.

The photocell was fully charged by irradiation of light from a 500 W xenon lamp at a distance of 25 cm. After stopping of the light irradiation, the photocell was discharged to a final voltage of 1.2 V at a current of 500 microamperes. Thereafter, the photocell was optically recharged to determine a steady state charging current 5 minutes after commencement of the optical charging.

Figure 17:
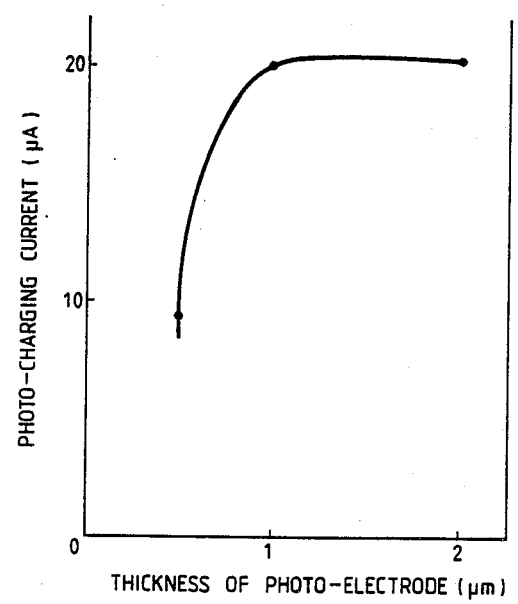
FIG. 17 is a graphical representation of a photo-charging current in relation to the variation in thickness of an optical or photo-electrode.

The results are shown in FIG. 17, which reveals that when the thickness of the positive photo-electrode is as thin as 5000 angstroms, the light passes to the positive capacitive electrode, so that the photo-charging rate lowers. Accordingly, with the thin layer-type photocell, the positive photo-electrode should preferably have a thickness of not less than 1 micrometer.

EXAMPLE 7

Figure 18:
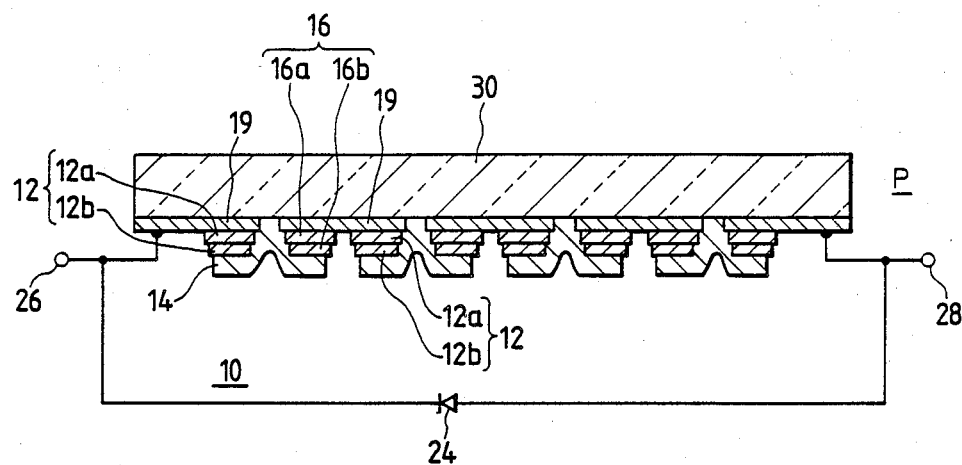
FIG. 18 is a schematic view illustrating fabrication of a plurality of photocells of the type as shown in FIG. 7.

Fabrication of a plurality of unit cells which are connected in series as shown in FIG. 18, is described in this example. Each cell unit of this embodiment is of the type shown in FIG. 7.

A $SnO_2$ thin film (TOC thin film) was formed on one side of a transparent glass substrate 30 by a normal pressure CVD technique in a thickness of 4000 angstroms. The thin film was subjected to laser patterning to form common current collectors 19 of a certain pattern shown in FIG. 18. It will be noted that the current collectors formed at opposite ends act as a positive and negative current collectors.

Thereafter, positive and negative photo-electrodes made, respectively, of an n-type semiconductor and a p-type semiconductor were formed in the following manner on certain regions of the $SiO_2$ thin films by CVD, separated from each other.

First, after covering the negative electrode regions with a polyimide-coated SUS mask, n-type a-Si thin films 12a were formed in a thickness of 200 angstroms by subjecting a $PH_3/SiH_4$ gas mixture to plasma reaction at a substrate temperature of 300° C. Next, the Si thin films 12a were covered with a polyimide-coated SUS mask, and a $B_2H_6/SiH$ gas mixture was subjected to plasma reaction at a substrate temperature of 250° C. to form 300 angstroms thick p-type a-Si thin films 16a.

Subsequently, 2000 angstroms thin films 12b, 16b of ion-plated $C_2Mo_6S_8$ were formed on each n-type a-Si thin film 12a and each p-type a-Si thin film 16b, respectively, thereby forming positive electrodes 12 and negative electrodes 16.

Finally, thin films 14 of $RbCu_4I_{1.5}Cl_{3.5}$ solid electrolyte were formed as shown. A photo-charging diode 24 was connected as an external circuit.

The resultant photocell P had four unit cells 10 connected in series. The open circuit voltage of one unit cell was 0.5 V. Thus, the total open circuit voltage amounted to 2.0 V. An increasing number of unit cells results in an increasing open circuit voltage.

For the photocell P, a peak discharging current of 500 microamperes was readily obtained and the charging and discharging cycles reached 1000 cycles or over.

EXAMPLE 8

The general procedure of Example 7 was repeated except that n-type CdS thin films were formed instead of the n-type a-Si thin films and p-type CdTe thin films were formed instead of the p-type Si thin films, both by sputtering.

Further, 2000 angstroms thick thin films obtained by ion-plating of a mixture of $Cu_2Mo_6S_8$ and $RbCu_4I_{1.5}Cl_{3.5}$ were used as the capacitive electrodes 12b instead of the $Cu_2Mo_6S_8$ thin films.

The resultant photocell P was found to have similar characteristic properties as the photocell of Example 7.

Similar results were also obtained using as the photo-electrode a mixture of an n-type semiconductor and a solid electrolyte as used above and using only one thin film structure of a mixture of a semiconductor and a Chevrel compound instead of the two-layered structure for both positive and negative electrodes. In addition to the semiconductor and Chevrel compound, the solid electrolyte may be further added to the thin film.

EXAMPLE 9

A graphite disk current collector having an outer diameter of 13 mm with an opening having a diameter of 10 mm was placed in a mold having a diameter of 13 mm. 0.1 g of a positive photo-electrode material composed of (K) n-$ZrS_2$,(L) n-InSe, or (N) a mixture of n-InSe and $RbCu_4I_{1.5}Cl_{3.5}$ at a mixing ratio by weight of 8:2 was uniformly placed on the current collector and preliminarily pressed at a pressure of 100 kg/cm$^2$. In (M), no positive electrode was formed. Subsequently, 0.04 g of a positive capacitive electrode material composed of $Cu_{1.1}Mo_6S_{7.6}$ and $RbCu_4I_{1.5}Cl_{3.5}$, both in the form of a powder, at a mixing ratio by weight of 11 was placed in the mold and preliminarily pressed. Next, 0.2 g of a solid electrode powder of the formula, $RbCu_4I_{1.5}Cl_{3.5}$, was preliminarily pressed on the positive capacitive electrode layer, followed by preliminary pressing of 0.04 g of a mixture for negative capacitive electrode of $Cu_{1.1}Mo_6S_{7.6}$ and $RbCu_4I_{1.5}Cl_{3.5}$ at a mixing ratio by weight of 1:1 as used for the positive capacitive electrode. Finally, for the cells (M) using no positive photo-electrode and (N) using the n-InSe positive photo-electrode, 0.01 g of a mixture for negative photo-electrode composed of p-$Cu_6PS_5I$ and $RbCu_4I_{1.5}Cl_{3.5}$ at a mixing ratio by weight of 8:2 was placed in the mold, on which a graphite disk current collector for the negative electrode was placed, similarly as used for the current collector for the positive electrode. The laminate was press molded at a pressure of 4 tons/cm$^2$ to obtain four pellet-type photocells.

Figure 19:
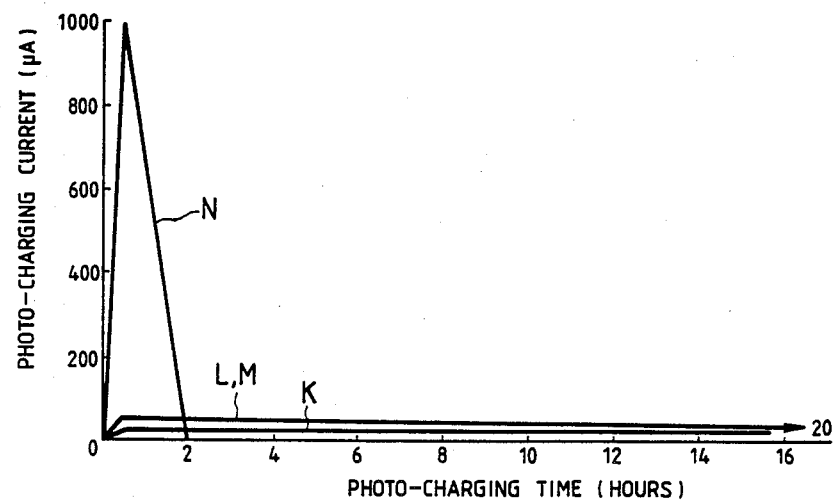
FIG. 19 is a graphical representation of the charge current in relation to the variation in photo-charging time for different materials used as a positive photo-electrode.

These photocells were subjected to measurement of variation in photo-charging current by irradiation of light from a 500 W xenon lamp at a distance of 60 cm. The results are shown in FIG. 19. From the figure, it will be seen that although the times before the photo-charging current reaches zero depend upon the band gap of the photo-electrode and the number of the photo-electrodes, the quantities of charged electricity are all approximately 1.0 mA-hour. At the time when the photo-charging current reaches zero, the photocells have been almost completely charged. Also, it was found that the charging time becomes shortened when using two photo-electrodes and is shorter at a wider band gap.

Figure 20:
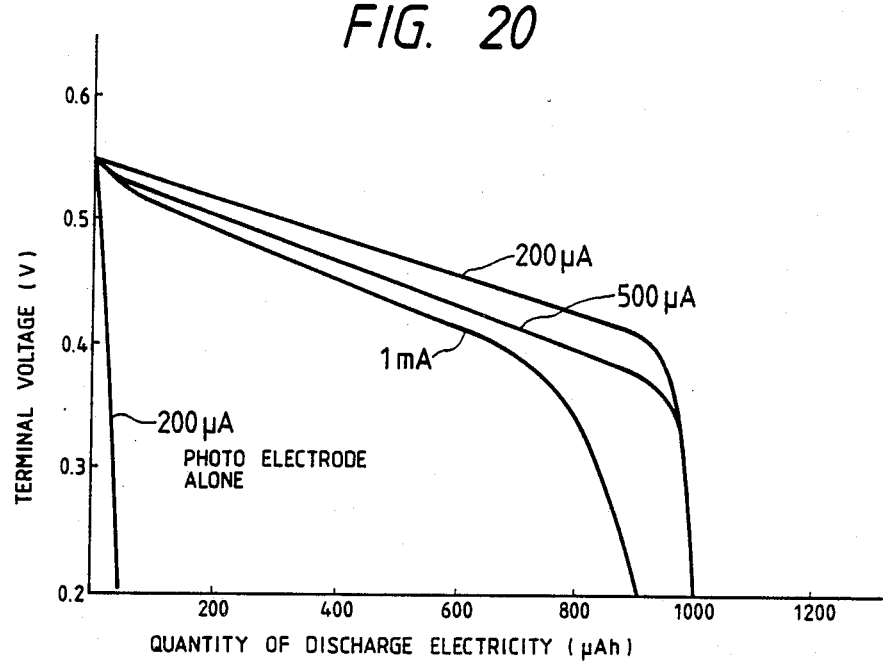
FIG. 20 is a graphical representation of the terminal voltage of the photocell of Example 9 in relation to the variation in quantity of discharge current.

Next, the photocell N which exhibited the shortest photo-charging time as in FIG. 19, and a photocell using the same weight as the photocell N and a photo-electrode alone were each discharged at a constant electric current to determine the relation between the quantity of discharging electricity and the voltage. The results are shown in FIG. 20. The figure reveals that the photocell using the photo-electrode alone has little capacity. In contrast, with the photocells of the invention, the capacity is substantially at the same level up to 500 microamperes (377 microamperes/cm$^2$) and lowers slightly at 1 mA. It was found that loads requiring an instantaneous large current of about 300 to 500 microamperes, e.g. analogue electronic time pieces, step motors, buzzers of electronic computers and the like, could be operated with this type of photocell.

Figure 21:
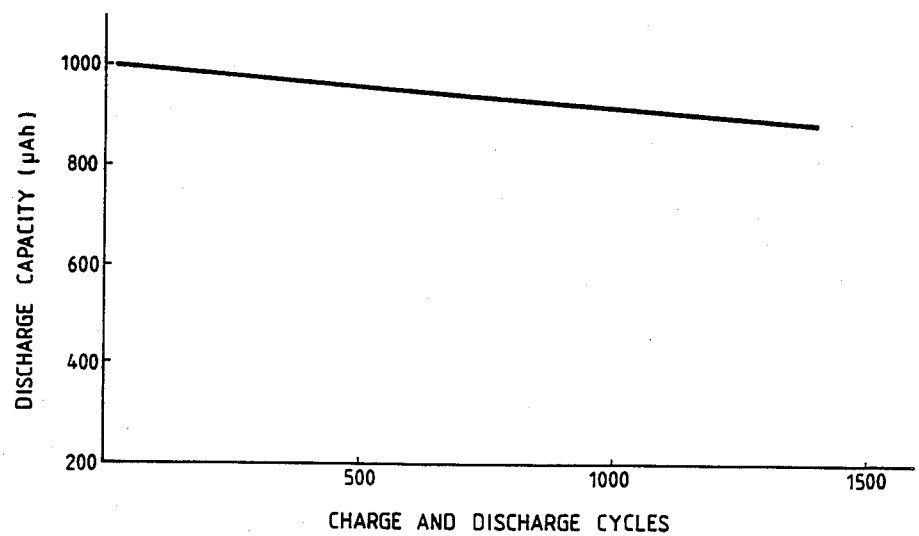
FIG. 21 is a graphical representation of the life of the photocell used in FIG. 20.

Moreover, the photocell N was subjected to a cycle life test. In the test, the photocell was subjected to 200 cycles of discharging at 500 microamperes for 15 minutes and photo-charging for 1 hour. Thereafter, the photocell was discharged at 500 microamperes to determine the capacity and then optically charged for 2 hours, followed by repeating the charging and discharging cycle. The results are shown in FIG. 21, revealing that the photocell barely deteriorated after repetition of 1400 discharging and charging cycles and could withstand practical use.

As will be seen from this example, with photocells using a Cu$^+$ ion conductive solid electrolyte, it is preferred that the positive and negative electrodes are each formed of a photo-electrode and a capacitive electrode. The positive photo-electrode is made of an n-type semiconductive layer compound having a band gap of about 2.0 eV and the negative photo-electrode is made of p-type semiconductive layer compound having a band gap of about 2.0 eV. Each capacitive electrode is made of a layer compound having high electron and ion conductivities. Alternatively, only the negative capacitive electrode may be made of a mixture of Cu and $Cu_2S$. These compounds or materials for the respective electrodes are so controlled that the electromotive force of the resultant cell at the time of complete discharge becomes zero and and that the number of Cu atoms incorporated into the layer compound as the capacitive electrodes are controlled within limits. This type of photocell ensures rapid charge and discharge and a long life.

EXAMPLE 10

This example illustrates fabrication of a photocell of the type shown in FIG. 10.

1.0 of a powder of $RbCu_4I_{1.5}Cl_{3.5}$ was placed in a mold and preliminarily pressed, on which 0.2 g of a powder mixture of $Cu_2Mo_6S_8$ and $RbCu_4I_{1.5}Cl_{3.5}$ at a mixing ratio by weight of 1:1 was placed and preliminarily pressed at 300 kg/cm$^2$. The latter layer was removed along a center line to separate it into two sub-layers so that the sub-layers were formed on the first solid electrolyte layer separated from each other but connected through the first solid electrolyte layer. A pellet obtained by pressing at 300 kg/cm$^2$ 0.2 g of a powder mixture of $ZrS_2$ and $RbCu_4I_{1.5}Cl_{3.5}$ at a mixing ratio by weight of 1:1 was placed on one of the sub-layers. Likewise, a pellet obtained by pressing at a pressure of 300 kg/cm$^2$ 0.2 g of a powder mixture of $Cu_3PS_4$ and $RbCU_4I_{1.5}Cl_{3.5}$ was placed on the other sub-layer. A adhesive carbon film having an opening to allow light to pass into the respective semiconductor layers was placed on the sub-layers to form a conductive electrode as shown. Similarly, adhesive carbon films were placed on the positive and negative semiconductor layers to form the respective current collectors. Thus, a solid-state photocell was obtained. The open-circuit voltage was 0.5 volts. In order to increase the open-circuit voltage, it is sufficient to provide photocells connected in series. A peak current of 10 mA could be readily obtained. The photocell could be charged and discharged over 1000 cycles.

The connection between the n-type and p-type semiconductor layers with the conductive electrode ensures more efficient utilization of electrons and holes produced in the n-type and p-type semiconductor layers by light irradiation than in the positive n-type semiconductor layer alone. Accordingly, high speed charging will become possible.

EXAMPLE 11

Figure 22:
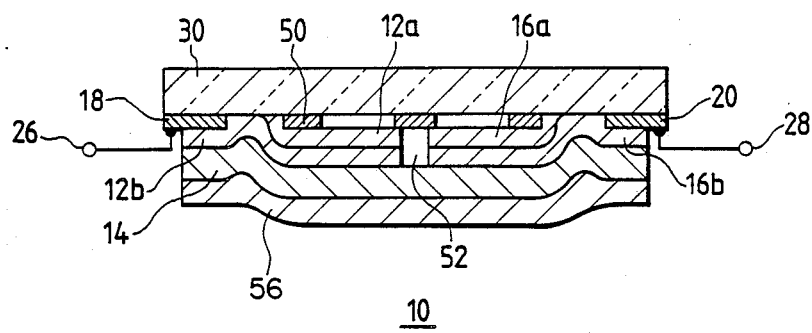
FIG. 22 is a schematic view of a thin photocell used in an example.

This example describes fabrication of the photocell of FIG. 22, which is substantially the same as the photocell of FIG. 11.

Current collectors 18, 20 and a conductive electrode 50 were formed on a glass substrate 30 by the use of an adhesive carbon film in a pattern as shown in FIG. 22. A paste of a powder mixture of n-$ZrS_2$ and $RbCu_4I_{1.5}Cl_{3.5}$ in a non-aqueous solvent was applied to one of openings of the conductive electrode 50 by screen printing and dried. A paste of a powder mixture of p-$Cu_3PS_4$ and $RbCu_4I_{1.5}Cl_{3.5}$ in a non-aqueous solvent was similarly applied to the other opening by screen printing and dried. Thereafter, a paste of a powder mixture of $C_2Mo_6$ and $RbCu_4I_{1.5}Cl_{3.5}$ was separately formed on the the respective semiconductive layers 12a, 16a. As a result, a space 52 was formed between the positive and negative electrodes 12, 16. A paste of a solid electrolyte of $RbCu_4I_{1.5}Cl_{3.5}$ was next screen printed over the both electrodes 12, 16 while leaving the space 52, followed by further screen printing of a paste of a powder mixture of $Cu_2Mo_6S_8$ $Cu_2Mo_6S_8$ and $RbCu_4I_{1.5}Cl_{3.5}$ to form a back electrode layer 56. The resultant photocell was of a thin type.

In this type of photocell, the n-type and p-type semiconductors are the same as those defined above. If the solid electrolyte used is a $Cu^+$ ion conductive solid electrolyte, it is preferred to add the solid electrolyte to the n-type semiconductor layer serving as a positive photo-electrode. Also, it is preferred that the positive and negative capacitive electrodes are each made of a mixture of a copper Chevrel compound and the solid electrolyte mentioned above.

EXAMPLE 12

Fabrication of the photocell of FIG. 12 by press molding is described in this example.

100 mesh Cu nets of a semi-circular form were placed as a current collector on the bottom of a mold having a diameter of 13 mm. A powder mixture composed of 0.096 g of electrolytic Cu powder, 0.064 g of $Cu_2S$ and 0.04 g of $RbCu_4I_{1.5}Cl_{3.5}$ solid electrolyte used to form a $Cu^+$ ion conductive layer or electrode was uniformly placed on the respective Cu nets, followed by preliminary pressing at a pressure of 100 kg/cm$^2$. Subsequently, 0.2 g of a $RbCu_4I_{1.5}Cl_{3.5}$ solid electrolyte was placed in the mold and preliminary pressed. A powder mixture of 0.025 g of $Cu_2Mo_6S_{8-y}$ and 0.025 g of the solid electrolyte was further placed in the mold for use as positive and negative capacitive electrodes and also preliminarily pressed. On the capacitive electrodes were placed two graphite semi-rings each having an opening for receiving a photo-electrode. Powder mixtures of 0.016 g of n-type and p-type semiconductor powders and 0.04 g of the solid electrolyte were, respectively, placed on the openings, followed by pressing at a pressure of 3 tons/cm$^2$ to obtain a pellet. The above procedure was repeated using different n-type and p-type semiconductors indicated in the following table.

TABLE

| Sample No. | n-type Semiconductor | p-type Semiconductor | OCV (mV) | Capacitive Electrode |
|---|---|---|---|---|
| 1 | $TiO_2$ (Eg = 3.0eV) | InSe (Eg = 2.0 eV) | 520 | yes |
| 2 | CdS (Eg = 2.4eV) | InSe | 525 | yes |
| 3 | InSe (Eg = 2.0eV) | InSe | 525 | yes |
| 4 | $ZrS_2$ (Eg = 1.7eV) | InSe | 520 | yes |
| 5 | InSe | GaP (Eg = 2.4 eV) | 520 | yes |
| 6 | InSe | $Cu_3PS_4$ (Eg = 2eV) | 525 | yes |
| 7 | InSe | InSe | 500 | no |

It will be noted that dopants for n-type and p-type semiconductors are well known in the art and are not described in detail herein and any dopants may be used provided that semiconductors exhibit n-type or p-type conductivity as desired. For instance, phosphorous may be used to make an n-type Si semiconductor and boron may be used for a p-type Si semiconductor.

Two pellets were made for each sample. The n and p-type cell units were connected with a wire as shown in FIG. 12. Since a transparent substrate was not formed, the positive and negative photo-electrodes were so arranged set that they were facing in the same direction. While a DC current applied between both photo-electrodes was set at zero by the use of a potentiostat, each sample was irradiated with light from a 500 W xenon lamp at a distance of 25 cm to obtain a variation in photo-charging current. After the electric current was in a steady state, the irradiation was continued for one further hour, after which the open circuit voltage was measured at the time when the light irradiation was stopped. Thereafter, the variation in short-circuit discharge current was determined in the absence of the light irradiation under conditions where the applied DC voltage was zero.

In order to check the combination of the photo-electrode and capacitive electrode, a photocell was fabricated in the same manner as described above, except that the capacitive electrode was not formed and the positive and negative electrodes were formed of n-InSe and p-InSe, respectively. The resultant photocell was sample 7 indicated in the table.

Figure 23:
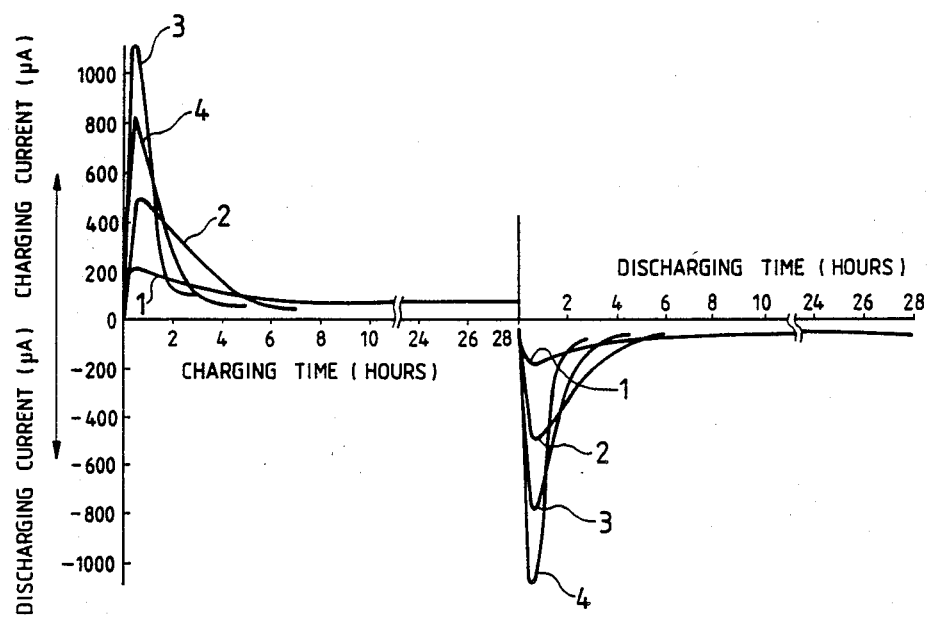
FIGS. 23 and 24 are, respectively, a graphical representation of optical charge and short-circuiting discharge currents in relation to the variation in charging and discharging times for different optical electrode materials.
Figure 24:
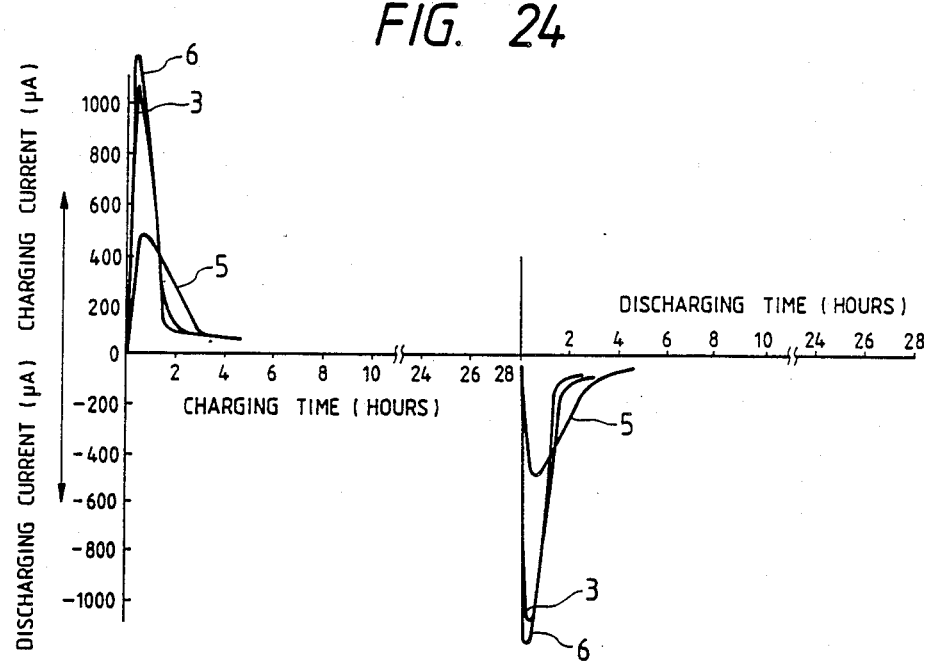
Figure 25:
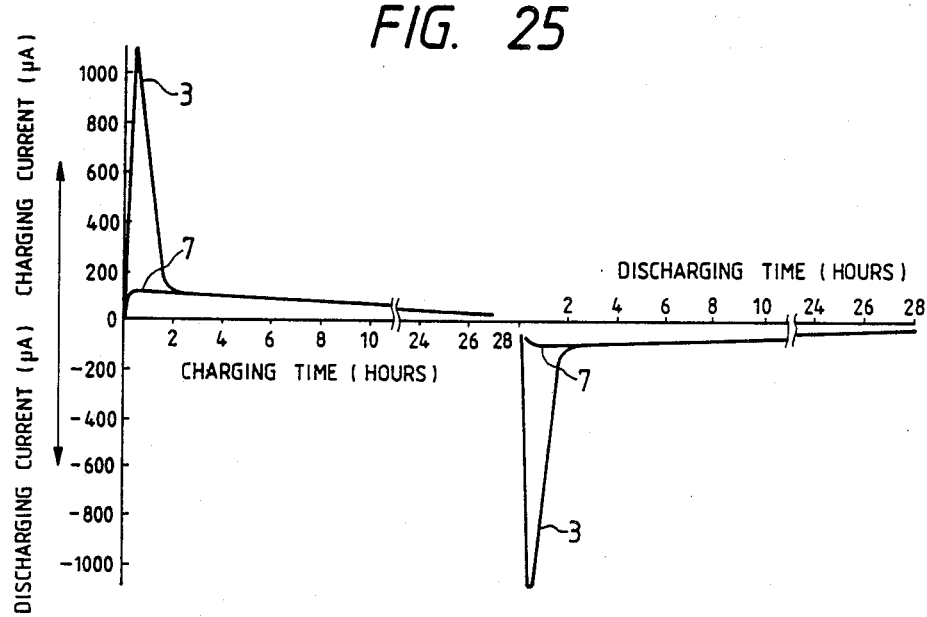
FIG. 25 is a graphical representation of an influence of a capacitive electrode on optical charge and short-circuiting discharge currents.

The variation in photo-charging current and short-circuiting discharging current in relation to the charging time for sample Nos. 1 to 4 using different n-type semiconductors is shown in FIG. 23. The variation for different p-type semiconductors is shown in FIG. 24. The effect of the capacitive electrode is shown in FIG. 25.

From these figures, it will be seen that the charging and discharging currents are larger than those of the photocell using no capacitive electrode. The use of photo-electrode materials having a band gap not less than 1.7 eV in combination with capacitive electrode materials ensures satisfactory charging with light.

The photocell using two cell units is simpler in fabrication than a photocell using one cell in which two photo-electrodes are provided, and is capable of producing larger charging and discharging currents.

What is claimed is:

1. A photoelectrochemical cell comprising:
   a positive electrode made of a conductive semiconductor which is able to generate electron-hole pairs when irradiated with light and a Chevrel compound having a three-dimensional structure which allows metal atoms thereof to be deintercalated in the form of metal ions by reaction with said holes;

a current collector for said positive electrode provided in contact with said positive electrode;

a metal ion conductive solid electrolyte layer provided in contact with one side of said positive electrode to receive said metal ions when said Chevrel compound is deintercalated;

a negative electrode provided in contact with said solid electrolyte layer without direct contact with said positive electrode; and a current collector for said negative electrode provided in contact with said negative electrode, whereby when light is irradiated on said positive electrode so that said conductive semiconductor adsorbs light at an energy level higher than a band gap thereof, said cell is photoelectrochemically charged and is discharged when said positive and negative electrodes are electrically connected.

2. A photoelectrochemical cell according to claim 1, wherein said conductive semiconductor comprises an n-type semiconductor selected from the group consisting of $ZrS_2$, $ZrS_3$, $TiS_2$, $HfS_2$, $HfSe_2$, $SnS_2$, $MoS_2$, $InSe$, $Si$, $Ge$, $TiO_2$, $GaAs$, $CdS$, $ZnO$, and mixtures thereof.

3. A photoelectrochemical cell according to claim 1, wherein said conductive semiconductor comprises an n-type semiconductive layer compound having a hexagonal or rhombohedral crystal form and selected from the group consisting of $ZrS_2$, $ZrS_3$, $TiS_2$, $HfS_2$, $HfSe_2$, $SnS_2$, $MoS_2$, $InSe$, and mixtures thereof.

4. A photoelectrochemical cell according to claim 1, wherein said metal atom-containing compound comprises a Chevrel compound of the formula, $Cu_xMo_6S_{8-y}$ or $Ag_xMo_6S_{8-y}$ in which x is $0 < x \leq 4$ and y is from 0 to 0.4.

5. A photoelectrochemical cell according to claim 4, wherein said Chevrel compound comprises $Cu_2Mo_6S_8$.

6. A photoelectrochemical cell according to claim 4, wherein said Chevrel compound comprises $Cu_xMo_6S_{8-y}$ in which x is $0 < x \leq 4$ and y is from 0.1 to 0.4.

7. A photoelectrochemical cell according to claim 1, wherein said positive electrode includes one layer made of a mixture of said conductive semiconductor and said Chevrel compound.

8. A photoelectrochemical cell according to claim 1, wherein said positive electrode includes a two-layered construction having a photo-electrode comprising said conductive semiconductor and a capacitive electrode comprising said Chevrel compound, said photo-electrode being directly exposed to light.

9. A photoelectrochemical cell according to claim 8, wherein said photo-electrode comprises an n-type semiconductor of the formula, $(Ti_aZr_{1-a})S_{2-y}$, in which $0.5 \leq a \leq 0.75$ and $b \geq 0.1$.

10. A photoelectrochemical cell according to claim 8, wherein said photo-electrode has a thickness sufficient to absorb substantially all light incident thereon.

11. A photoelectrochemical cell according to claim 8, wherein said capacitive electrode comprises a Chevrel compound of the formula, $Cu_xMo_6S_{8-y}$ or $Ag_xMo_6S_{8-y}$ in which x is $0 < x \leq 4$ and y is from 0 to 0.4.

12. A photoelectrochemical cell according to claim 11, wherein said Chevrel compound comprises $Cu_2Mo_6S_8$.

13. A photoelectrochemical cell according to claim 11, wherein said Chevrel compound comprises $Cu_xMo_6S_y$ in which x is $0 < x \leq 4.0$ and y is from 0.1 to 0.4.

14. A photoelectrochemical cell according to claim 1, wherein said metal ion conductive solid electrolyte layer comprises a Cu ion conductive solid electrolyte.

15. A photoelectrochemical cell according to claim 14, wherein said $Cu^+$ ion conductive solid electrolyte is of the formula, $Rb_hK_{1-h}Cu_4X$, in which h is from 0.8 to 1, and X is a halogen or a mixture of halogens.

16. A photoelectrochemical cell according to claim 15, wherein the formula is $Rb_hK_{1-h}Cu_4I_{1.5}Cl_{3.5}$ in which h is from 0.8 to 1.

17. A photoelectrochemical cell according to claim 16, wherein the formula is $RbCu_4I_{1.5}Cl_{3.5}$.

18. A photoelectrochemical cell according to claim 14, wherein said Cu ion conductive solid electrolyte comprises a member selected from the group consisting of $RbAg_4I_5$, $RbCu_4I_{1.5}Cl_{3.5}$, $Rb_{4.2}Cu_{15.8}I_{6.8}Cl_{13.2}$, $Rb_{4.2}Cu_{15.8}I_{7.0}Cl_{13.0}$, $Rb_{4.2}Cu_{15.8}I_{7.2}Cl_{12.8}$, $Rb_{4.2}Cu_{15.8}I_{7.4}Cl_{12.6}$, $Rb_{3.8}Cu_{16.2}I_{6.8}Cl_{13.2}$, $Rb_{3.8}Cu_{16.2}I_{7.0}Cl_{13.0}$, $Rb_{3.8}Cu_{16.2}I_{7.2}Cl_{12.8}$, $Rb_{3.8}Cu_{16.2}I_{7.4}Cl_{12.6}$, $Rb_{4.0}Cu_{16.6}I_{6.6}Cl_{13.4}$, $Rb_{4.0}Cu_{16}I_{6.8}Cl_{13.2}$, $Rb_{4.0}Cu_{16}I_{7.0}Cl_{13.0}$, $Rb_{4.0}Cu_{16}I_{7.2}Cl_{12.8}$, $Rb_{4.0}Cu_{16}I_{7.4}Cl_{12.6}$, $Rb_{4.0}Cu_{16}I_{7.6}Cl_{12.4}$, $Rb_{4.0}Cu_{16}I_{7.8}Cl_{12.2}$, $Rb_{4.0}Cu_{16}I_{8.0}Cl_{12.0}$, and mixtures thereof.

19. A photoelectrochemical cell according to claim 1, wherein said negative electrode comprises a mixture of a $Cu^+$ ion conductive solid electrolyte, electrolytic copper powder, and $Cu_2S$.

20. A photoelectrochemical cell according to claim 1, wherein said negative electrode comprises Ag or Cu.

21. A photoelectrochemical cell according to claim 1, wherein said positive electrode, said solid electrolyte layer, and said negative electrode are disposed in this order.

22. A photoelectrochemical cell according to claim 1, wherein said positive electrode and said negative electrode are disposed on one surface of said solid electrolyte layer in side-by-side, spaced apart relation so that there is no direct contact therebetween.

23. A photoelectrochemical cell according to claim 1, further comprising a body of a transparent substrate material, and said positive electrode, said solid electrolyte layer and said negative electrode being disposed on one surface of said body in this order.

24. A photoelectrochemical cell according to claim 1, further comprising a body of a transparent substrate material, and said positive electrode, said solid electrolyte layer and said negative electrode being disposed on one surface of said body in such a way that said positive electrode and said negative electrode are in side-by-side spaced part relation, on one side thereof and said solid electrolyte layer is disposed on another side of said positive and negative electrodes.

25. A photoelectrochemical cell according to claim 1, wherein said negative electrode comprises a two-layered construction including a photo-electrode and a capacitive electrode.

26. A photoelectrochemical cell according to claim 25, wherein said photo-electrode comprises a p-type semiconductor selected from the group consisting of $FePS_3$, $Cu_3PS_4$, $Cu_{6-c}PS_5I$ in which $0 < c < 1$, polyacetylene, Si, Ge, GaAs, SiC, CdS, PbO, CdTe, and mixtures thereof.

27. A photoelectrochemical cell according to claim 25, wherein said capacitive electrode comprises a Chevrel compound.

28. A photoelectrochemical cell according to claim 27, wherein said capacitive electrode comprises said Chevrel compound to which a $Cu^+$ ion conductive solid electrolyte is added.

29. A photoelectrochemical cell according to claim 28, wherein said solid electrolyte is of the formula, $Rb_hK_{1-h}Cu_4X$, in which h is from 0.8 to 1, and X is a halogen or a mixture of halogens.

30. A photoelectrochemical cell according to claim 29, wherein the formula is $Rb_hK_{1-h}Cu_4I_{1.5}Cl_{3.5}$ in which h is from 0.8 to 1.

31. A photoelectrochemical cell according to claim 29, wherein the formula is $RbCu_4I_{1.5}Cl_{3.5}$.

32. A photoelectrochemical cell according to claim 28, wherein said Cu ion conductive solid electrolyte is a member selected from the group consisting of $RbAg_4I_5$, $RbCu_4I_{1.5}Cl_{3.5}$, $Rb_{4.2}Cu_{15.8}I_{6.8}Cl_{13.2}$, $Rb_{4.2}Cu_{15.8}I_{7.0}Cl_{13.0}$, $Rb_{4.2}Cu_{15.8}I_{7.2}Cl_{12.8}$, $Rb_{4.2}Cu_{15.8}I_{7.4}Cl_{12.6}$, $Rb_{3.8}Cu_{16.2}I_{6.8}Cl_{13.2}$, $Rb_{3.8}Cu_{16.2}I_{7.0}Cl_{13.0}$, $Rb_{3.8}Cu_{16.2}I_{7.2}Cl_{12.8}$, $Rb_{3.8}Cu_{16.2}I_{7.4}Cl_{12.6}$, $Rb_{4.0}Cu_{16}I_{6.6}Cl_{13.4}$, $Rb_{4.0}Cu_{16}I_{6.8}Cl_{13.2}$, $Rb_{4.0}Cu_{16}I_{7.0}Cl_{13.0}$, $Rb_{4.0}Cu_{16}I_{7.2}Cl_{12.8}$, $Rb_{4.0}Cu_{16}I_{7.4}Cl_{12.6}$, $Rb_{4.0}Cu_{16}I_{7.6}Cl_{12.4}$, $Rb_{4.0}Cu_{16}I_{7.8}Cl_{12.2}$, $Rb_{4.0}Cu_{16}I_{8.0}Cl_{12.0}$, and mixtures thereof.

33. A photoelectrochemical cell according to claim 1, wherein said positive electrode comprises a photo-electrode and a capacitive electrode and said solid electrolyte layer comprises a molded layer of a $Cu^+$ ion conductive solid electrolyte, in which said photo-electrode comprises a molded mixture of an n-type semiconductive layer compound and said $Cu^+$ ion conductive solid electrolyte, said capacitive electrode comprises a molded mixture of a copper Chevrel compound and said $Cu^+$ ion conductive solid electrolyte, said negative electrode comprises a molded mixture of electrolytic copper powder, $Cu_2S$ and said $Cu^+$ ion conductive solid electrolyte, said current collector for said negative electrode comprises copper, and said current collector for said positive electrode comprises graphite.

34. A photoelectrochemical cell according to claim 1, wherein said positive electrode comprises a photo-electrode and a capactive electrode superposed on one side of said photo-electrode, the current collector for the positive electrode being disposed on another side of said photo-electrode, and said solid electrolyte layer, said negative electrode and said current collector superposed on said capacitive electrode in this order.

35. A photoelectrochemical cell according to claim 1, wherein said photoelectrochemical cell comprises a thin film construction which comprises, disposed in the following order, a Cu film current collector for said negative electrode, a film comprising a mixture of copper and $Cu_2S$ as said negative electrode, a $Cu^+$ ion conductive solid electrolyte film as said solid electrolyte, said positive electrode comprises a film of $Cu_xMo_6S_{8-y}$ in which x is $0 < x \leq 4$ and y is from 0 to 0.4 as a capacitive electrode and an n-type semiconductor layer compound film as a photo-electrode, and a graphite layer formed in contact with said photo-electrode for use as said current collector for said positive electrode.

36. A photoelectrochemical cell comprising a positive electrode including a photo-electrode comprised of $(Ti_aZr_{1-a})S_{2-b}$ in which $0.5 \leq a \leq 0.75$ and $b \geq 0.1$ and a capacitive electrode comprised of a $Cu_xMo_6S_{8-y}$, in which $0 < x \leq 4$ and y is from 0 to 0.4 and formed on one side of said photo-electrode, a current collector for said positive electrode formed on another side of said photo-electrode in a manner not impeding passage of light into said photo-electrode from another side, a $Cu^+$ ion conductive solid electrolyte layer, a copper-containing negative electrode, and a current collector for said negative electrode, said positive electrode, said solid electrolyte layer, said negative electrode and said current collector for said negative electrode being superposed in this order.

37. A photoelectrochemical cell according to claim 36, wherein said photo-electrode comprises a molded layer of a mixture of said $Cu^+$ ion conductive solid electrolyte and $(Ti_aZr_{1-a})S_{2-b}$ in which $0.5 \leq a \leq 0.75$ and $b \geq 0.1$, said capacitive electrode comprising a molded layer of a mixture of said $Cu^+$ ion conductive solid electrolyte and $Cu_xMo_6S_{8-y}$ in which $0 \leq x \leq 4$ and y is from 0 to 0.4, said negative electrode comprises a molded layer of a mixture of said $Cu^+$ ion conductive solid electrolyte, electrolytic copper powder and $Cu_2S$, said current collector for said negative electrode comprises copper, and said current collector for said positive electrode comprises graphite.

38. A photoelectrochemical cell according to claim 36, wherein said photo-electrode comprises a film $(Ti_aZr_{1-a})S_{2-b}$ in which $0.5 \leq a \leq 0.75$ and $b \geq 0.1$, said capacitive electrode comprises a film of $Cu_xMo_6S_{8-y}$ in which $0 < x \leq 4$ and y is from 0 to 0.4, said negative electrode comprises a film of a mixture of electrolytic copper powder and $Cu_2S$, said current collector for said negative electrode comprises a film of copper, and said current collector for said positive electrode comprises a film of graphite provided in contact with said photo-electrode.

39. A photoelectrochemical cell according to claim 38, further comprising an optically transparent substrate provided on said photo-electrode and a resin cover for protecting said photoelectrochemical cell.

40. A photoelectrochemical cell comprising an optically transparent substrate, a positive electrode which comprises an n-type semiconductor and a Chevrel compound, a negative electrode which comprises a p-type semiconductor and a Chevrel compound formed on one side of said substrate in side-by-side, spaced apart relation, a common metal ion conductive solid electrolyte layer provided in contact with both said positive and said negative electrode, and optically transparent current collectors for said positive and negative electrodes provided between said substrate and said positive and negative electrodes, respectively.

41. A photoelectrochemical cell according to claim 40, wherein said n-type semiconductor comprises at least one member selected from the group consisting of $ZrS_2$, $ZrS_3$, $TiS_2$, $HfS_2$, $HfSe_2$, $SnS_2$, $MoS_2$, $InSe$, $Si$, $Ge$, $TiO_2$, $GaAs$, $CdS$, $ZnO$, and mixtures thereof, and said p-type semiconductor comprises at least one member selected from the group consisting of $FePS_3$, $Cu_3PS_4$, $Cu_{6-c}PS_5I$ in which $0 < c < 1$, polyacetylene, $Si$, $Ge$, $GaAs$, $SiC$, $CdS$, $PbO$, and $CdTe$.

42. A photoelectrochemical cell according to claim 40, wherein said positive electrode includes a photo-electrode which comprises said n-type semiconductor and a capacitive electrode which comprises said Chevrel compound, and said negative electrode includes a photo-electrode which comprises said p-type semiconductor and a capacitive electrode which comprises said Chevrel compound, said photo-electrodes of said positive electrode and said negative electrode contacting with said respective current collectors, said capacitive electrodes contacting with said common solid electrolyte layer.

43. A photoelectrochemical cell according to claim 40, wherein said positive electrode comprises a film of a mixture of said n-type semiconductor and said Chevrel compound, and said negative electrode comprises a film of a mixture of said p-type semiconductor and said Chevrel compound.

44. A photoelectrochemical cell comprising:
an optically transparent substrate;
a positive electrode which includes a photo-electrode comprising a mixture of an n-type semiconductor capable of generating electron-hole pairs by irradiation of light and a $Cu^+$ ion conductive solid electrolyte and a capacitive electrode provided in contact with said photo-electrode and comprising a mixture of a Chevrel compound having a three dimensional structure which allows metal atoms thereof to be deintercalated in the form of metal ions by reaction with said holes and said $Cu^+$ ion conductive solid electrolyte;
a negative electrode which includes another photo-electrode comprising a mixture of a p-type semiconductor and said $Cu^+$ ion conductive solid electrolyte and a capacitive electrode provided in contact with said another photo-electrode and comprising a mixture of either said Chevrel compound used in said positive electrode and said $Cu^+$ ion conductive solid electrolyte, or Cu, $CuS_2$ and said $Cu^+$ ion conductive solid electrolyte, said positive electrode and said negative electrode being spaced apart from each other and disposed on said substrate such that said photo-electrodes of said positive and negative electrodes are in contact with said substrate;
a common layer of said $Cu^+$ ion conductive solid electrolyte in contact with said capacitive electrodes of said positive and negative electrodes; and
current collectors provided in contact with respective photo-electrodes while permitting light to be passed into said respective photo-electrodes when the light is applied through said substrate.

45. A photoelectrochemical cell comprising:
an optionally transparent substrate;
a positive electrode which includes a photo-electrode comprising an n-type semiconductor and a capacitive electrode provided in contact with said photo-electrode and comprising a compound of the formula, $Cu_xMo_6S_{8-y}$ wherein $x=2.3$ when $y=0$, $x=1.9$ when $y=0.1$ or $x=1.2$ when $0.2 \leq y \leq 0.4$;
a negative electrode which includes another photo-electrode comprising a p-type semiconductor and a capacitive electrode provided in contact with said another photo-electrode and comprising a compound of the formula, $Cu_xMo_6S_{8-y}$ wherein $x=2.3$ when $y=0$, $x=1.9$ when $y=0.1$ or $x=1.1$ when $0.2 \leq y \leq 0.4$, or a mixture of Cu and $Cu_2S$, said positive electrode and said negative electrode being spaced apart from each other and disposed on said substrate such that said photo-electrodes of said positive and negative electrodes are in contact with said substrate;
a common layer of a $Cu^+$ ion conductive solid electrolyte in contact with said capacitive electrodes of said positive and negative electrodes; and
current collectors provided in contact with respective photo-electrodes while permitting light to be passed into said respective photo-electrodes when the light is applied through said substrate.

46. A photoelectrochemical cell comprising;
an optically transparent substrate;
a positive electrode which includes a photo-electrode comprising an n-type semiconductor and a capacitive electrode provided in contact with said photo-electrode and comprising a compound of the formula, $Cu_dTi_6S_{2-e}$ wherein d is from 0 to 0.22 and e is from 0 to 0.17;
a negative electrode which includes another photo-electrode comprising a p-type semiconductor and a capacitive electrode provided in contact with said another photo-electrode and comprising a compound of the formula, $Cu_xMo_6S_{8-y}$ wherein $x=2.3$ when $y=0$, $x=1.9$ when $y=0.1$ or $x=1.2$ when $0.2 \leq y \leq 0.4$, or a mixture of Cu and $Cu_2S$, said positive electrode and said negative electrode being spaced apart from each other and disposed on said substrate such that said photo-electrodes of said positive and negative electrodes are in contact with said substrate;
a common layer of a $Cu^+$ ion conductive solid electrolyte in contact with said capacitive electrodes of said positive and negative electrodes; and
current collectors provided in contact with said respective photo-electrodes while permitting light to be passed into said respective photo-electrodes when the light is applied through said substrate.

47. A photoelectrochemical cell comprising:
a positive electrode which includes a photo-electrode comprising an n-type semiconductor capable of generating electron-hole pairs when irradiated with light and a capacitive electrode comprising a Chevrel compound having a three-dimensional structure which allows metal atoms thereof to be deintercalated in the form of metal ions by reaction with said holes and contacting at least a part of said photo-electrode and having a current collector;
a negative electrode which includes another photo-electrode comprising a p-type semiconductor and a capacitive electrode comprising a Chevrel compound capable of reversibly intercalating and deintercalating metal atoms therein, in contact with at least a part of said another photo-electrode and having a current collector, said negative electrode being spaced apart from said positive electrode;
a common layer of a metal ion conductive solid electrolyte in contact with said capacitive electrodes; and
conductive electrodes contacting at least a part of said respective photo-electrodes for electrical connection of said photo-electrodes.

48. A photoelectrochemical cell according to claim 47, wherein said n-type semiconductor comprises at least one member selected from the group consisting of Si, Ge, CdS, $TiO_2$, GaAs, ZnO, $ZrS_2$, $TiS_2$, $HfS_2$, $HfSe_2$, $SnS_2$, $MoS_2$, and InSe, and said p-type semiconductor comprises at least one member selected from the group consisting of Si, Ge, GaAs, SiC, CdS, PbO, CdTe, $FePS_3$, $Cu_3PS_4$, $Cu_{6-c}PS_5I$ in which $0<c<1$, and polyacetylene.

49. A photoelectrochemical cell according to claim 47, wherein the same metal containing compound is used for both capacitive electrodes and comprises a member selected from group consisting of Chevrel compounds and vornites.

50. A photoelectrochemical cell according to claim 47, wherein said solid electrolyte comprises a Cu or Ag ion conductive solid electrolyte.

51. A photoelectrochemical cell according to claim 47, wherein said metal ion conductive solid electrolyte comprises a $Cu^+$ ion conductive solid electrolyte, both photo-electrodes and both capacitive electrodes further comprise said $Cu^+$ ion conductive solid electrolyte said current collectors for said capacitive electrodes comprise graphite, and said conductive electrodes comprise a light-permeable material.

52. A photoelectrochemical cell according to claim 51, wherein said conductive electrodes have such a shape as to permit light to pass into said respective photo-electrode.

53. A photoelectrochemical cell according to claim 47, wherein said photo-electrodes, said capacitive electrodes, said solid electrolyte layer and said conductive electrodes are each formed as thin films.

54. A photoelectrochemical cell which comprises:
an optically transparent substrate;
a first cell unit which is formed on one surface of said substrate and which includes an n-type photo-electrode comprising a mixture of an n-type semiconductor and a copper ion conductive solid electrolyte, a capacitive electrode formed on said n-type photo-electrode on one side thereof comprising a mixture of a compound of the formula, $Cu_xMo_6S_{8-y}$ wherein $0 < x \leq 4$ and y is from 0.1 to 0.4 and said copper ion conductive solid electrolyte used in said n-type photo-electrode, a layer of said copper ion conductive solid electrolyte formed on another side of said capacitive electrode, a reversibly copper transferable electrode formed on said solid electrolyte layer and comprising a mixture of electrolytic copper powder, $Cu_2S$ and said copper ion conductive solid electrolyte, a first current collector formed on said reversibly copper transferable electrode, and a second current collector having an opening receiving said n-type photo-electrode therein and provided in contact with said capacitive electrode;
a second unit cell which is formed on said one surface of said substrate and which includes a p-type photo-electrode comprising a mixture of a p-type semiconductor and said copper ion conductive solid electrolyte, a capacitive electrode formed on said p-type photo-electrode on one side thereof and comprising a mixture of a compound of the formula, $Cu_xMo_6S_{8-y}$ in which $0 < x \leq 4$ and y is from 0.1 to 0.4 and said copper ion conductive solid electrolyte, a layer of said copper ion conductive solid electrolyte formed on another side of said capacitive electrode, a reversibly copper transferable electrode formed on said solid electrolyte layer and comprising a mixture of electrolytic copper powder, $Cu_2S$ and said copper ion conductive solid electrolyte, a third current collector formed on said reversibly copper transferable electrode, and a fourth current collector having an opening receiving said p-type photo-electrode therein and provided in contact with said capacitive electrode, said first and second cell units being separated for each other; and
a conductive wire connecting said first and second cell units through said first and third current collectors.

55. A photoelectrochemical cell according to claim 54, wherein said n-type semiconductor comprises at least one member selected from the group consisting of n-$TiO_2$, n-CdS, n-InSe, n-$ZrS_3$, and n-$ZrS_2$, and said p-type semiconductor comprises at least one member selected from the group consisting of p-GaP, p-InSe, p-$Cu_{6-c}PS_5I$ wherein $0 < c < 1$, and p-$Cu_3PS_4$.

56. A photoelectrochemical cell according to claim 54, wherein said copper ion conductive solid electrolyte comprises a compound of the formula, $Rb_jK_{1-j}Cu_4I_{1.5}Cl_{3.5}$ in which $0.8 \leq j \leq 1.0$.

57. A photoelectrochemical cell according to claim 54, wherein said Cu ion conductive solid electrolyte comprises a member selected from the group consisting of $RbAg_4I_5$, $RbCu_4I_{1.5}Cl_{3.5}$, $Rb_{4.2}Cu_{15.8}I_{6.8}Cl_{13.2}$, $Rb_{4.2}Cu_{15.8}I_{7.0}Cl_{13.0}$, $Rb_{4.2}Cu_{15.8}I_{7.2}C_{12.8}$, $Rb_{4.2}Cu_{15.8}I_{7.4}C_{12.6}$, $Rb_{3.8}Cu_{16.2}I_{6.8}C_{13.2}$, $Rb_{3.8}Cu_{16.2}I_{7.0}C_{13.0}$, $Rb_{3.8}Cu_{16.2}I_{7.2}C_{12.8}$, $Rb_{3.8}Cu_{16.2}I_{7.4}C_{12.6}$, $Rb_{4.0}Cu_{16}I_{6.6}C_{13.4}$, $Rb_{4.0}Cu_{16}I_{6.8}C_{13.2}$, $Rb_{4.0}Cu_{16}I_{7.0}C_{13.0}$, $Rb_{4.0}Cu_{16}I_{7.2}C_{12.8}$, $Rb_{4.0}Cu_{16}I_{7.4}C_{12.6}$, $Rb_{4.0}Cu_{16}I_{7.6}C_{12.4}$, $Rb_{4.0}Cu_{16}I_{7.8}C_{12.2}$, $Rb_{4.0}Cu_{16}I_{8.0}C_{12.0}$, and mixtures thereof.

58. A photoelectrochemical cell according to claim 54, wherein said second and fourth current collectors comprise graphite.

* * * * *